US011930085B2

(12) United States Patent
Macskassy et al.

(10) Patent No.: US 11,930,085 B2
(45) Date of Patent: *Mar. 12, 2024

(54) MATCHING AND ATTRIBUTION OF USER DEVICE EVENTS

(71) Applicant: Branch Metrics, Inc., Palo Alto, CA (US)

(72) Inventors: Sofus Attila Macskassy, Palo Alto, CA (US); Dmitri Ariel Gaskin, Palo Alto, CA (US); Eric J. Glover, Palo Alto, NY (US); Kan Yu, Palo Alto, CA (US); Wenchang Yan, Palo Alto, CA (US)

(73) Assignee: Branch Metrics, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,730

(22) Filed: May 18, 2023

(65) Prior Publication Data
US 2023/0291806 A1    Sep. 14, 2023

Related U.S. Application Data

(63) Continuation of application No. 17/898,856, filed on Aug. 30, 2022, now Pat. No. 11,677,845, which is a (Continued)

(51) Int. Cl.
*H04L 67/53* (2022.01)
*G06F 16/955* (2019.01)
(Continued)

(52) U.S. Cl.
CPC .......... *H04L 67/53* (2022.05); *G06F 16/9558* (2019.01); *G06Q 30/0201* (2013.01);
(Continued)

(58) Field of Classification Search
CPC ......... H04L 67/20; H04L 29/08; H04L 67/02; H04L 67/22; H04L 67/306; G06F 16/9558; G06Q 30/0201
See application file for complete search history.

(56) References Cited

U.S. PATENT DOCUMENTS

| 10,091,312 B1* | 10/2018 | Khanwalkar | ......... H04L 67/306 |
| 2014/0120864 A1* | 5/2014 | Manolarakis | ........... H04W 4/23 455/405 |
| 2017/0353567 A1* | 12/2017 | Aliabadi | ................. H04L 67/53 |

FOREIGN PATENT DOCUMENTS

| KR | 20140089543 A | 7/2014 |
| WO | 2013070687 A1 | 5/2013 |

* cited by examiner

*Primary Examiner* — Tonia L Dollinger
*Assistant Examiner* — Joseph M Cousins
(74) *Attorney, Agent, or Firm* — RMCK Law Group PLC

(57) ABSTRACT

A method includes receiving first event data from a device, the first event data including a first identifier (ID) that identifies the device, web browser metadata, and data associated with an application state. The method includes generating a first persona including the first ID and a first event identifier that identifies a first user action. The method includes receiving second event data, the second event data including device metadata and a second ID that identifies the device. The method includes generating a second persona based on the second event data, the second persona including the second ID and a second event identifier that identifies a second user action. Additionally, the method includes determining that the first and second personas are associated with the device based on matches between the browser metadata and device metadata and transmitting a response to the device configured to route the device to the application state.

24 Claims, 18 Drawing Sheets

Related U.S. Application Data continuation of application No. 17/402,552, filed on Aug. 15, 2021, now Pat. No. 11,445,032, which is a continuation of application No. 15/972,707, filed on May 7, 2018, now Pat. No. 11,095,732.

(60) Provisional application No. 62/502,816, filed on May 8, 2017.

(51) Int. Cl.
*G06Q 30/0201* (2023.01)
*H04L 65/40* (2022.01)
*H04L 67/02* (2022.01)
*H04L 67/306* (2022.01)
*H04L 67/50* (2022.01)

(52) U.S. Cl.
CPC .............. *H04L 65/40* (2013.01); *H04L 67/02* (2013.01); *H04L 67/306* (2013.01); *H04L 67/535* (2022.05)

MATCHING AND ATTRIBUTION OF USER DEVICE EVENTS

CROSS-REFERENCE TO RELATED APPLICATIONS

This application is a continuation of U.S. application Ser. No. 17/898,856, filed on Aug. 30, 2022, which is a continuation of U.S. application Ser. No. 17/402,552, filed on Aug. 15, 2021, now U.S. Pat. No. 11,445,032, which is a continuation of U.S. application Ser. No. 15/972,707, filed on May 7, 2018, now U.S. Pat. No. 11,095,732, which claims the benefit of U.S. Provisional Application No. 62/502,816, filed on May 8, 2017. The disclosures of each of the above applications are incorporated herein by reference in their entirety.

FIELD

The present disclosure relates to providing analytics and linking functionality across multiple computing platforms.

BACKGROUND

Software developers can develop websites and applications that are accessed by users on a variety of different platforms, such as different computing devices and operating systems. Example websites/applications may include e-commerce applications, social media applications, and business review applications. In some cases, the websites and applications can include similar content. Some software developers may want to persuade users to download and use their application, as their application may provide a more custom/advanced user experience than their website. For similar reasons, developers may want to direct users into their application from other locations, such as their website or other websites. Developers may acquire analytics regarding the acquisition and usage of their websites and applications so that they can gain a better understanding of how their application is acquired and used on the different platforms.

SUMMARY

In one example, the present disclosure is directed to a method comprising receiving first event data from a user device generated in response to a first user action on a web browser of the user device. The first event data includes a first device identifier (ID) that identifies the user device, web browser metadata, and data associated with an application state. The method further comprises generating a first persona data object based on the first event data, the first persona data object including the first device ID and a first event identifier that identifies the first user action. The method further comprises receiving second event data from the user device generated in response to a second user action on an application installed on the user device. The second event data includes device metadata and a second device ID that identifies the user device. The method comprises generating a second persona data object based on the second event data, the second persona data object including the second device ID and a second event identifier that identifies the second user action. The method further comprises determining that the first persona data object and the second persona data object are associated with the user device based on matches between the web browser metadata and the device metadata. Additionally, the method comprises transmitting a response to the user device including routing data configured to route the installed application to the application state associated with the first event data.

In one example, the present disclosure is directed to a method comprising generating, at a computing device, a first data object that includes a first device identifier (ID) and web browser metadata that are associated with a web browser application on a user device. The method further comprises generating a second data object that includes a second device ID and device metadata that are associated with an installed application on the user device. The method further comprises determining a matching score based on the web browser metadata and the device metadata. The matching score indicates that the first device ID and the second device ID are likely associated with the user device. The method further comprises receiving web event data from the user device that is generated in response to a user action on the web browser application. The web event data includes the first device ID and includes data associated with an application state. The method further comprises receiving application event data from the user device that is generated by the installed application. The application event data includes the second device ID. Additionally, the method comprises, in response to receiving the application event data and determining the matching score indicates that the first and second device IDs are likely associated with the user device, transmitting a response to the user device including routing data configured to route the installed application to the application state associated with the web event data.

In one example, the present disclosure is directed to a system comprising one or more storage devices and one or more processing units. The one or more storage devices are configured to store a first data object and a second data object. The first data object includes a first device identifier (ID) and web browser metadata that are associated with a web browser application on a user device. The second data object includes a second device ID and device metadata that are associated with an installed application on the user device. The one or more processing units are configured to execute computer-readable instructions that cause the one or more processing units to determine a matching score based on the web browser metadata and the device metadata. The matching score indicates that the first device ID and the second device ID are likely associated with the user device. The one or more processing units are configured to receive web event data from the user device, the web event data generated in response to a user action on the web browser application. The web event data includes the first device ID and data associated with an application state. The one or more processing units are configured to receive application event data from the user device that is generated by the installed application, the application event data including the second device ID. In response to receiving the application event data and determining the matching score indicates that the first and second device IDs are likely associated with the user device, the one or more processing units are configured to transmit a response to the user device including routing data configured to route the installed application to the application state associated with the web event data.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
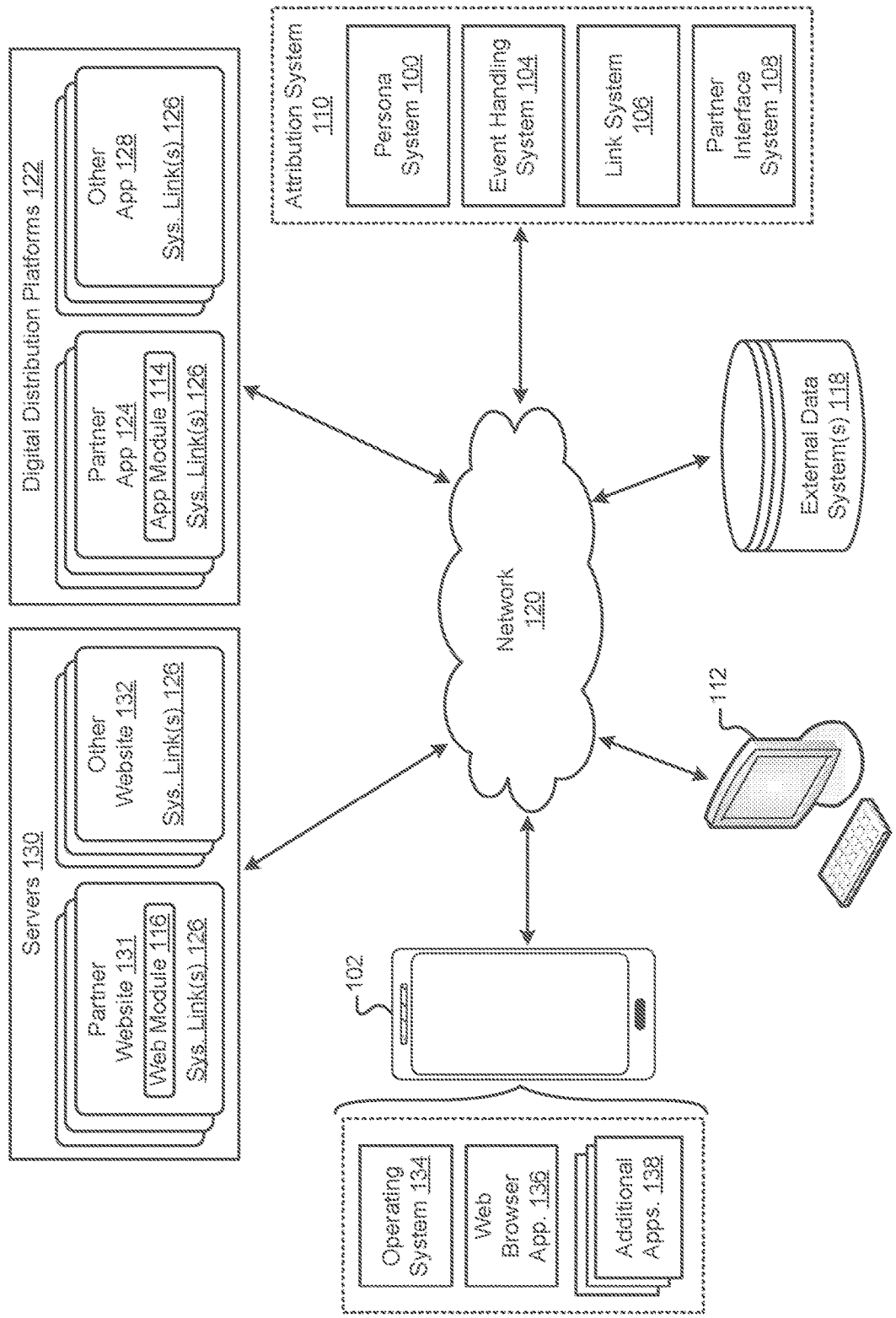
FIG. 1 illustrates an environment that includes an attribution system in communication with a user device, a partner device, and external data systems.

A persona system 100 of the present disclosure receives event data 300 generated by user devices 102 (e.g., mobile computing devices). User devices 102 may generate event data 300 while a user is browsing websites and/or using an application (e.g., a native application) installed on the user device 102. For example, event data 300 may be generated when a user opens/closes an application, views a webpage, and/or selects links (e.g., hyperlinks) in an application or on a webpage. The persona system 100 can track events that occur on user devices 102 over time and attribute the occurrence of some events to prior events. For example, the persona system 100 may attribute the installation of an application to a prior user selection of a link, such as a hyperlink on a webpage or a banner advertisement. As another example, the persona system 100 may attribute the purchase of an item on a website and/or application to a previously selected link. The attribution functionality provided by the persona system 100 can be useful to a variety of parties, such as businesses, advertisers, and application developers that may wish to monitor performance of their applications/websites, and that may pay a fee for the occurrence of certain events (e.g., application installs and/or item purchases). Additionally, the attribution functionality provided by the persona system 100 may also be used by other computing systems described herein (e.g., the event handling system 104) to provide various functionality to user devices 102, such as routing a user device 102 into an application state in response to user selection of a web link.

The event data 300 received by the persona system 100 may include device identifiers (hereinafter "device IDs") that identify the user device that generated the event data 300. For example, device IDs may include a string of alphabetic, numeric, and/or symbolic characters (e.g., punctuation marks) that can be used to identify (e.g., uniquely identify) a user device among other user devices. The persona system 100 can use the various device IDs for tracking events (e.g., application installations, application opens, and link selections) and attributing events to prior events.

Some device IDs may be associated with a web browser on a user device (e.g., set by a web browser). Device IDs associated with the web browser may be referred to herein as "web IDs." Example web IDs may include browser cookie IDs, which may be referred to as web cookies, internet cookies, or Hypertext Transfer Protocol (HTTP) cookies.

Some device IDs may be associated with applications installed on the user device other than the web browser. In some cases, the device IDs may be operating system generated IDs that installed applications may access. Additional example device IDs may include advertising IDs, which may vary depending on the operating system (OS) on the user device. Example advertising IDs may include Apple, Inc.'s Identifier for advertising (IDFA) which may be used on devices running IOS®, or Google, Inc.'s Google Advertising ID (GAID) which may be used on devices running the ANDROID® OS. Another example device ID may be a hardware device ID (e.g., a unique device serial number). Although example device IDs described herein may include web device IDs, advertising IDs, and hardware IDs, the techniques of the present disclosure may be applicable to other types of IDs that can be used to uniquely identify a user device.

The persona system 100 stores event data 300 in persona data objects (e.g., at 600 of FIG. 6B), which may be referred to herein as "personas." Each persona may include data (e.g., a list of events) indicating how a person uses one or more user devices over time. For example, a single persona may include data indicating how a person uses a web browser and multiple applications on a single user device (e.g., a smartphone). In a more specific example, a single persona may include data indicating how a person interacts with a partner's website and application. The persona system 100 may store one or more personas for each user device from which event data 300 is received.

The persona system 100 updates existing personas in response to receiving event data associated with device IDs that are the same as device IDs included in existing personas. The persona system 100 may generate a new persona for each event associated with a new device ID (e.g., a new device ID not included in other personas). Since a single user device may generate multiple device IDs (e.g., web IDs and/or advertising IDs), the persona system may store multiple personas for a single device. For example, with respect to FIG. 8, the persona system 100 may store two personas associated with the same user device, where one persona is associated with a web ID (e.g., a browser cookie ID) and another persona is associated with another type of device ID (e.g., an advertising ID). The persona associated with the web ID may represent a user's web browsing on the user device (e.g., browsing on a partner's website and/or other websites). The persona associated with the advertising ID may represent the user's application usage on the user device (e.g., usage across multiple applications other than the web browser). For example, the persona associated with the advertising ID may represent usage of a partner's application and/or other applications on the user device.

The persona system 100 can include matching functionality that identifies different personas (e.g., personas with different device IDs) that belong to the same user device. For example, the persona system 100 may match two personas based on data including, but not limited to, the Internet Protocol (IP) addresses of the user devices, OS names, OS versions, device types, screen resolutions, and user identification data (e.g., a username. In one example, the persona system 100 may combine persona data (e.g., event data) from matching personas into a single persona. In another example, the persona system may update the data in one persona to indicate that another persona is likely from the same user device. For example, the persona system may update a first persona with a reference to a second persona to indicate that the first and second personas are likely from the same user device. A reference to another persona may be referred to herein as a "persona reference." A persona may include one or more persona references, depending on the number of personas that are likely from the same user device. In some implementations, the persona system 100 may combine personas and/or include references in personas based on a level of certainty associated with the determination that the different personas belong to the same user device (e.g., based on a matching score). The persona system 100 can use the combined/referenced persona data for making a variety of decisions described herein, such as attribution decisions. For example, the persona system can determine that an event is attributable to a prior event. In this example, the persona system may update one or more personas to indicate that the subsequent event is attributable to the prior event. In a more specific example, the persona system may include data in the persona of the subsequent event to indicate that the event is attributable to a prior event in another persona. The reference to another event that indicates attribution may be referred to herein as an "attribution reference" or an "event reference." The references between events may also include the associated matching score. The matching scores may also be assigned at a level other than the event level, such as at the device ID level or persona level. For example, a matching score may be assigned between a web ID and a device ID (e.g., see FIG. 18).

Different personas associated with the same user device may each include data for one or more events. For example, a persona associated with a web ID may include data for on one or more web events, and a persona associated with a different device ID (e.g., an advertising ID) may include data for one or more app events. In a specific example, the persona system 100 may include a persona for web browsing associated with a website (e.g., a partner's website), and include a different persona associated with browsing an application (e.g., a different partner's application). The personas for the same user device may remain independent until a time when the persona system 100 determines that the personas should be combined or include references to one another.

In some implementations, the persona system 100 may modify personas that match one another (e.g., are likely from the same user device), and then combine the matching personas at a later time when more data is available to indicate that the personas are associated with the same user device. For example, the persona system may initially include persona references in personas based on matches that are determined using device/browser metadata (e.g., IP addresses, OS names, OS versions, device types, screen resolutions) and user identification data. At a later time, the persona system may receive event data that indicates that the personas are from the same user device. For example, the persona system 100 may receive an event including multiple device IDs (e.g., a web ID and an advertising ID), which indicates that personas associated with the multiple device IDs are from the same user device. In this example, the persona system may combine two personas associated with the device IDs, whereas the two separate personas may have previously included persona references to one another. A match between two personas (e.g., two device IDs) based on an event including multiple device IDs may be referred to herein as a "strong match."

The persona system 100 can receive event data from a variety of different sources. In some implementations, the persona system 100 can receive event data from an event handling system 104 (e.g., see FIG. 5). The event handling system 104 can receive event data 300 from user devices, send event data 300 to the persona system 100 for logging (e.g., in personas), and provide event responses 302 to the received event data 300. In some cases, the event handling system 104 can leverage persona data to provide responses to a user device based on past events generated by the user device, as illustrated by the following example. If a user selects a link for accessing content in an application that the user device does not have installed, the persona system 100 can log the selection of the link and the event handling system 104 can redirect the user to download/install the application. Upon opening the newly installed application, the application can transmit an event to the event handling system 104, which may also be logged in the persona system 100. The persona system 100 may match the two personas and, based on the match, the event handling system 104 can direct the opened application to the content linked to by the previously selected link. In this example, the opening of the application and installation of the application may be attributed to the selection of the link.

In some implementations, the event handling system 104 can communicate with a link system 106 (e.g., FIG. 5) that generates and stores data for use in user-selectable links, such as advertisement links and/or links to shared content. For example, the link system 106 may generate and store a system link data object (e.g., at 602 in FIG. 6A) that includes a link-system Uniform Resource Identifier (hereinafter "system URI") and link data. The system URI may indicate the network location of the system link data object (e.g., using a domain/path). The system URI may be included in a user-selectable link (referred to herein as a "system link") in an application or on a website. Example user-selectable links may include hyperlinks, graphical user interface (GUI)

buttons, graphical banners, or graphical overlays. In response to selection of a system link, a user device may access the event handling system 104, which may in turn access the link system 106 in order to prepare a response to the user device. For example, in response to receiving a system URI from a user device, the event handling system 104 can retrieve link data corresponding to the received system URI and perform a variety of functions based on the retrieved link data. In one example, the event handling system 104 can redirect the user device based on the link data (e.g., to download the application or to a default location). In another example, the event handling system 104 may pass the link data (e.g., a discount code, user referral name, etc.) to the user device so that the user device can act based on the link data. The persona system 100 may log the selection of the system links in personas and attempt to match the system link selections to other events included in the same persona or different personas.

In some implementations, a single party (e.g., a business) can own/operate the persona system 100, event handling system 104, and link system 106. In these implementations, the single party can provide the functionality of the persona system 100, event handling system 104, and link system 106 to various partners via a partner interface system 108. The persona system 100, event handling system 104, link system 106, and partner interface system 108 operated by a single party for use by one or more partners may be collectively referred to as an "attribution system 110" (e.g., see FIG. 1).

An example partner is represented by the partner computing device 112 (hereinafter "partner device 112") that the partner may use to communicate with the partner interface system 108. An example partner may be a business that has a mobile application and/or website. The partner (e.g., business) may integrate with the attribution system 110 in order to add linking and/or attribution functionality to their application/website. The partners may communicate with the partner interface system 108 in order to integrate with the attribution system 110 and retrieve data from the attribution system 110. For example, the partner may interface with the partner interface system 108 using a dashboard (e.g., a web-based dashboard interface) and/or an application programming interface (API) provided by the partner interface system 108. Although a single partner device 112 is illustrated, a plurality of partner devices associated with a plurality of different partners may communicate with the partner interface system 108.

The partner can integrate with the attribution system 110 in a variety of ways. For example, the partner can retrieve application and web module components 114, 116 that the partner can modify and include into their application(s) and website. The application and web module components 114, 116 can include computer code that provides features for communicating with the attribution system 110 (e.g., the event handling system 104 and the link system 106). As another example, the partners can configure operation of the attribution system 110 via the partner interface system 108 for their purposes. For example, the partners can configure time limits for attribution (e.g., a maximum amount of time between two events), which may be referred to as an "attribution time window." The configurations for attributions (e.g., time limits) may be made on a use-case basis (e.g., install attribution, app open attribution, advertisement attribution, etc.). The partners may also generate system links for inclusion in their applications/websites and or other applications/websites.

The partners may retrieve data from the partner interface system 108 indicating how their applications, websites, and links perform (e.g., how users are using them). Example types of data may include, but are not limited to, attribution data indicating which events are attributed to other events, app installation data, app usage data, and website usage data. Additional types of data may include geographical data (e.g., the location of users using the partner's applications, websites, and/or links). The partner may retrieve data relating to individual events and/or aggregated data for multiple events.

Although the persona system 100, link system 106, event handling system 104, and partner interface system 108 may be operated by a single party for use by one or more partners, in some cases, the various systems of the attribution system 110 may be operated by different parties. For example, the persona system 100 may be operated by a first party (e.g., a business) independently from the other systems (e.g., the event handling system 104, link system 106, and/or partner interface system 108). In these cases, the event handling system 104, link system 106, and partner interface system 108 may be operated by one or more additional parties. Furthermore, in these cases, the persona system 100 may provide services to the other parties, such as logging event data, providing matching data, providing attribution data, and/or providing any other functionality attributed to the persona system herein.

Figure 8:
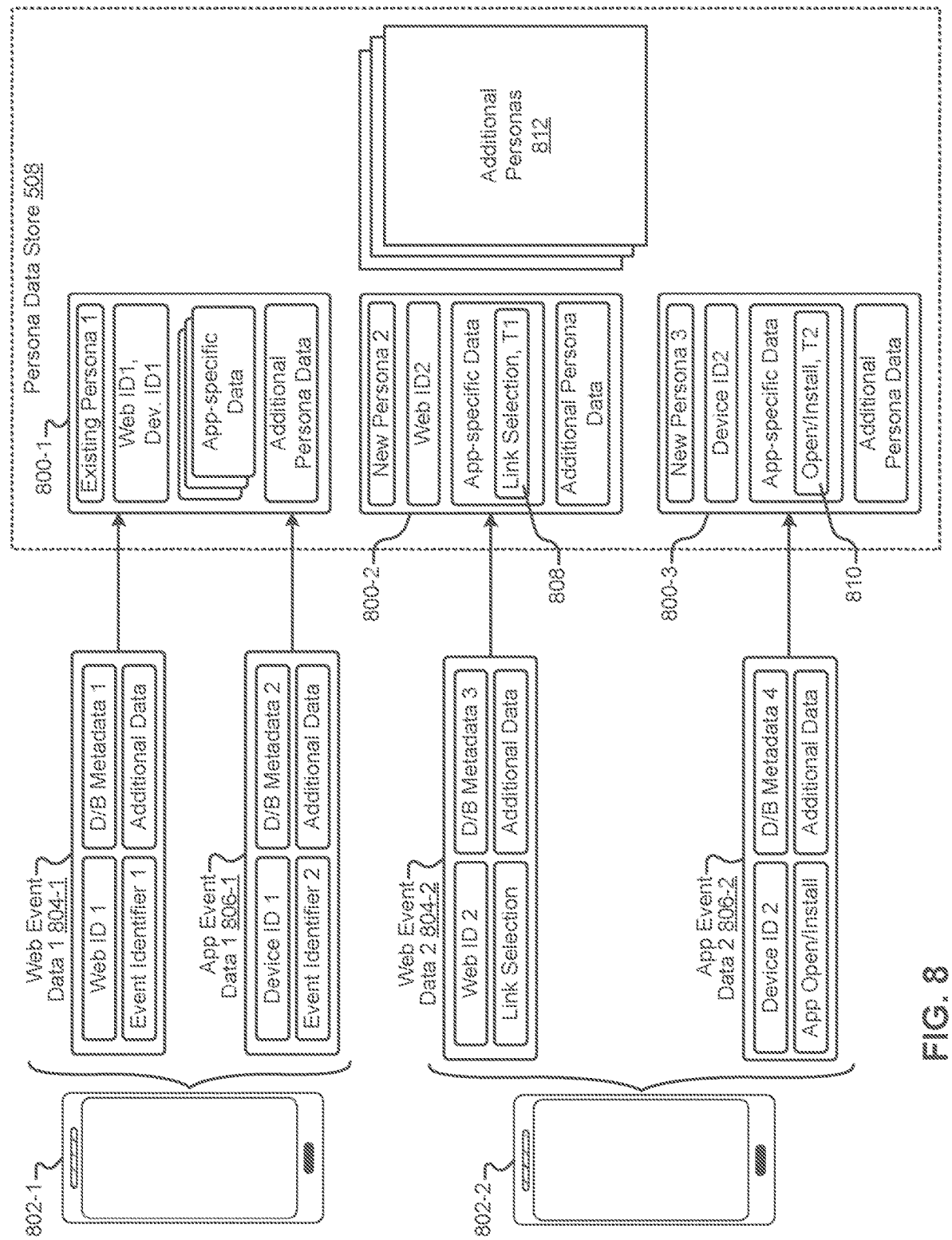
FIG. 8 is a functional block diagram that illustrates generation and updating of persona data objects in the persona data store.
Figure 9:
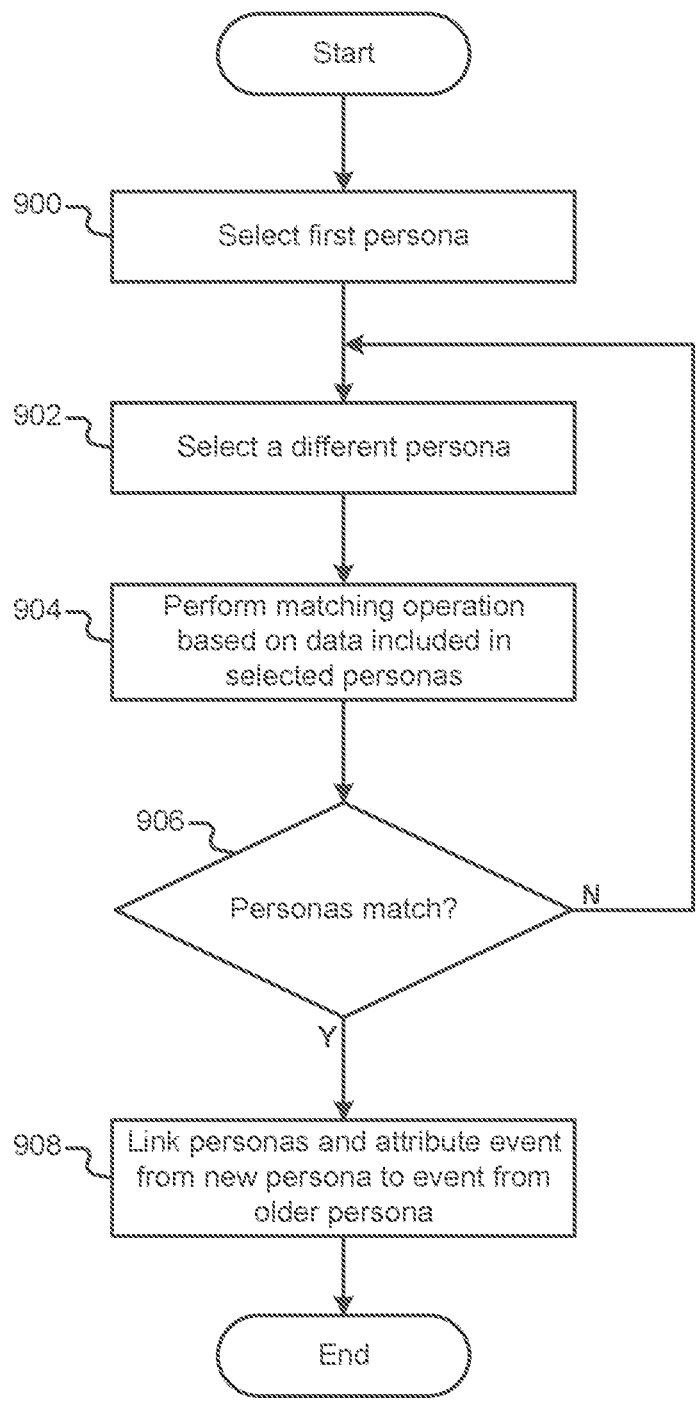
FIG. 9 illustrates an example method for matching persona data objects and attributing an event within a persona data object to a prior event in another persona data object.
Figure 10:
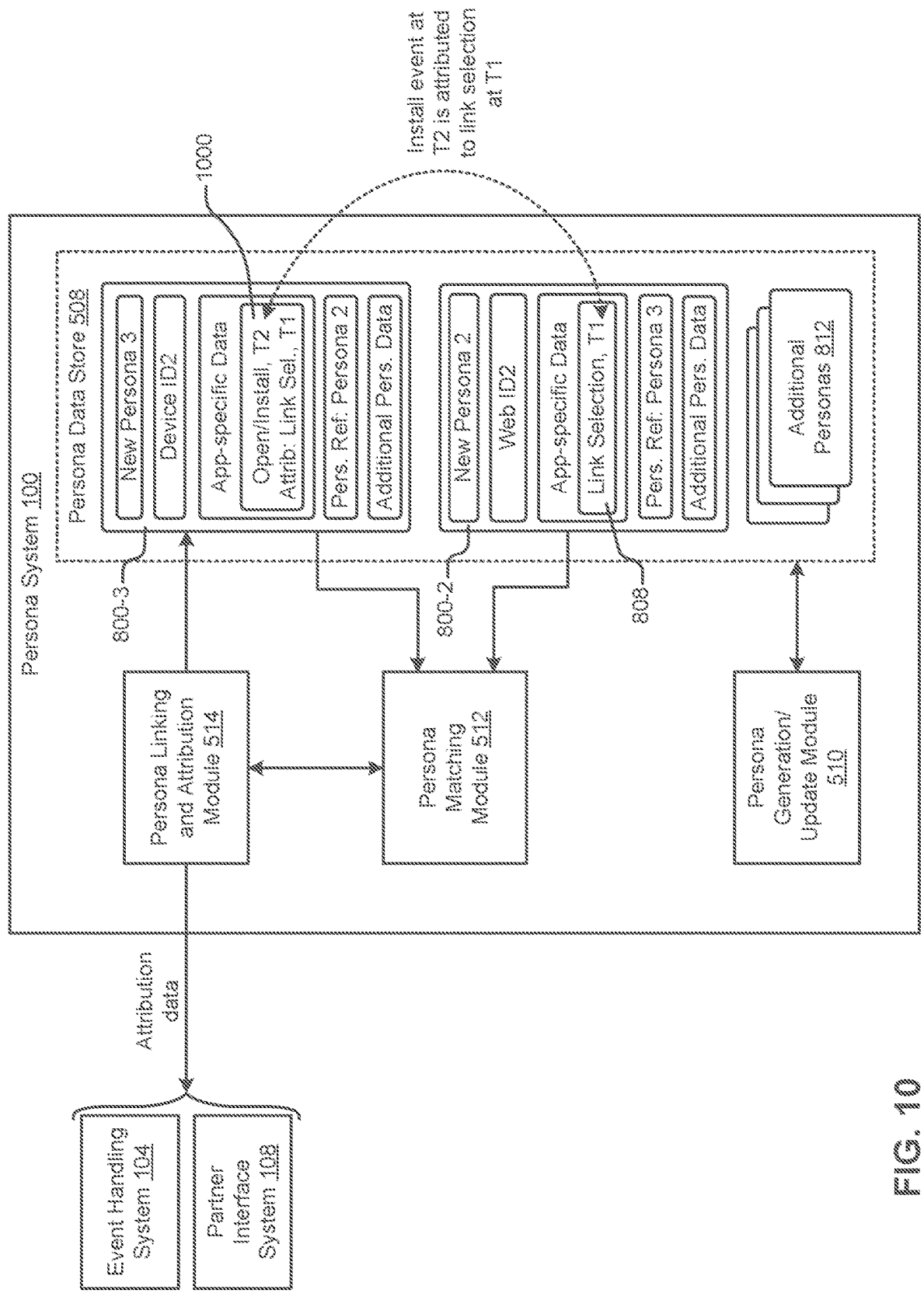
FIG. 10 is a functional block diagram that illustrates a persona matching module matching two persona data objects.

FIGS. 1-19 illustrate features of an attribution system 110 that can communicate with a plurality of partner devices 112, a plurality of user devices 102, and a plurality of external data systems 118. FIGS. 1-5 illustrate interactions between a partner device 112, a user device 102, an external data system 118, and an attribution system 110. FIG. 6A illustrates an example system link data object 602 that may be generated and stored by the link system 106. FIG. 6B illustrates an example persona 600 that may be generated and stored by the persona system 100. FIGS. 7-8, FIG. 14, and FIG. 18 illustrate generating and updating personas in the persona system 100. FIGS. 9-10 illustrate matching and attribution functionality of the persona system 100. FIGS. 11-13, FIGS. 15-17, and FIG. 19 illustrate example methods describing operation of the user devices 102 and the attribution system 110 for various events, such as link selection events, application open events, application installation events, and webpage view events.

FIG. 1 illustrates an example environment including an attribution system 110 in communication with a partner device 112, a user device 102, and an external data system 118 via a network 120. The network 120 may include various types of computer networks, such as a local area network (LAN), wide area network (WAN), and/or the Internet.

The environment includes one or more digital distribution platforms 122. The digital distribution platforms 122 may represent computing systems that are configured to distribute applications to user devices 102. Example digital distribution platforms include, but are not limited to, the GOOGLE PLAY® digital distribution platform by Google, Inc. and the APP STORE® digital distribution platform by Apple, Inc. The digital distribution platforms 122 may include one or more partner applications 124, each of which may include an app module 114 and/or system links 126. The digital distribution platforms 122 may also include a plurality of applications 128 developed by parties other than the partners. Users may download the applications 124, 128 from the digital distribution platforms 122 and install the applications on user devices 102.

The environment includes a plurality of servers 130 (e.g., web servers). The servers 130 may serve websites (or web applications) to the user devices 102. In some implementations, the servers 130 may serve partner websites 131 to the user devices 102. A partner website may include a web module 116, as configured by the partner, along with one or more system links 126. The servers 130 may also serve other websites 132 (e.g., other than those operated by the partners). In some cases, the other websites 132 may include system links 126.

The user device 102 includes an operating system 134 and a plurality of applications, such as a web browser application 136 and additional applications 138. Example additional applications may include, but are not limited to, e-commerce applications, social media applications, business review applications, banking applications, gaming applications, and weather forecast applications. Using the web browser 136, the user device 102 can access various websites on the servers 130 via the network 120. The user device 102 may also download applications from the digital distribution platforms 122 via the network 120 and install the applications.

The environment includes one or more external data systems 118. The external data systems 118 may represent computing systems that provide event data 300 ("external event data 300-4") to the attribution system 110. The external data systems 118 may be provided by parties other than the partners and the operators of the attribution system 110. In some implementations, the external data systems 118 may be operated by businesses that provide data management and analytics services (e.g., to the partners, the attribution system 110, and other parties). The external data systems 118 may collect additional data (e.g., in addition to the attribution system 118) regarding how users are using the partners' applications 124 and websites 131. In some cases, the partners may use the external data systems 118 to store event data and/or provide analytics. Example data management providers may include mParticle Inc. of New York, NY, and Segment Inc. of San Francisco, CA.

The external event data 300-4 may include data associated with events that occur with respect to the partners' websites 131 and/or applications 124. Additionally, or alternatively, the external event data 300-4 may be data associated with events that occur on websites 132 and applications 128 that are not operated by the partners. In some cases, the external event data 300-4 may include event data that is otherwise not acquired by the attribution system 310 (e.g., via the app/web modules 116, 114). For example, the external data systems 118 may receive additional event data via modules incorporated into the partners' websites/applications by other parties (e.g., the operators of the external data systems 118). The persona system 100 may process external event data 300-4 received from the external data systems 118 in a manner similar to event data received from the user devices.

Figure 2:
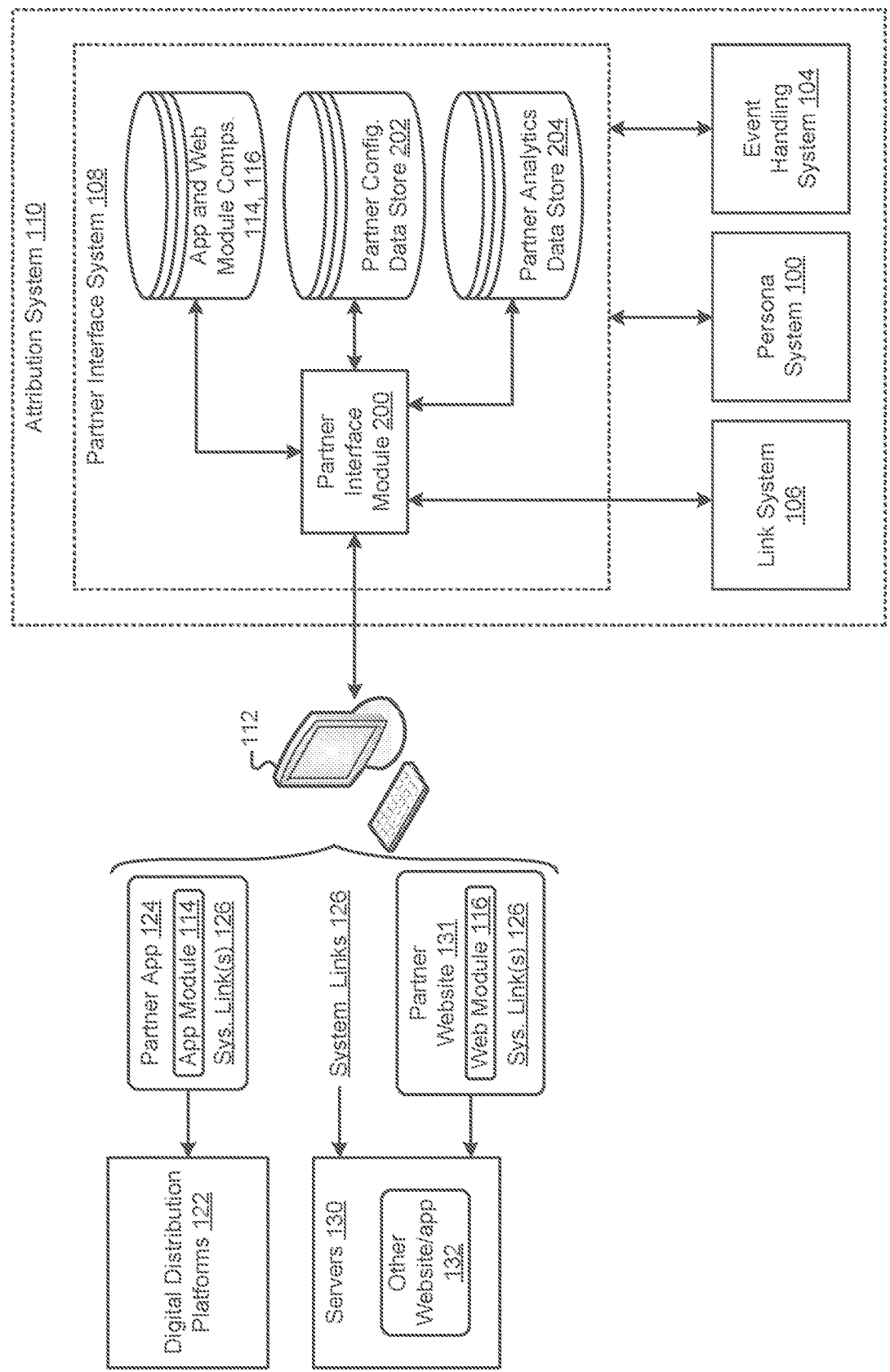
FIG. 2 illustrates partner integration with the attribution system via a partner interface system.

FIG. 2 illustrates partner integration with the attribution system 110 via the partner interface system 108. The partner interface system 108 includes a partner interface module 200, app and web module components 114, 116, a partner configuration data store 202, and a partner analytics data store 204. The partner interface module 200 provides functionality for interfacing with the partner interface system 108.

The partner interface module 200 may provide an interface for integrating with the attribution system 110. An example GUI provided by the partner interface module 200 may be referred to as a partner dashboard (not illustrated). The partner dashboard may include a web-based interface that includes a variety of GUI elements that assist the partner in configuring the attribution system 110 and retrieving data from the attribution system 110. Example GUI elements may include, but are not limited to, various data visualizations, spreadsheets, tables, graphs, selection elements (e.g., drop down boxes and menus), and text input boxes.

The partner may integrate with the attribution system 110 in any of the ways described herein via the partner interface module 200 (e.g., the partner dashboard). For example, the partner may retrieve the application module components 114 and/or the web module components 116 via the partner interface module 200, such as via the partner dashboard or via a website provided by the operator of the attribution system 110. The application module components 114 may include software libraries and functions/methods that may be included in the partner's application 124. The functions/methods may be invoked to provide applications with various functionalities described herein with respect to the attribution system 110. For example, the functions/methods may be invoked by the application to request system links, handle the selection of system links, transmit event data to the attribution system 110 (e.g., application open events), and handle data received from the attribution system 110. The integrated/modified application module components 114 included in the partner's application may be referred to as an "application module 114" or an "app module 114." The partner may upload the application 124 including the application module 114 to one or more digital distribution platforms 122.

The web module components 116 may include software libraries and functions/methods that may be included in the partner's website 131. The functions/methods (e.g., JavaScript) may be invoked to provide the website 131 with various functionalities described herein with respect to the attribution system 110. For example, the functions/methods may be invoked to request system links, handle the selection of system links, transmit event data to the attribution system 110 (e.g., webpage view events), and handle data received from the attribution system 110. The integrated/modified web module components 116 included in the partner's website 131 may be referred to as a "web module 116."

The partner may also configure how the attribution system 110 will behave with respect to the partner application 124, partner website 131, and partner links 126. For example, the partner may configure the attribution system 110 (e.g., using the partner dashboard) by configuring which events can be attributed to other events (e.g., which events are considered attributable events). For example, the partner may select the set of attributable events to include an application open event, an application install event, a commerce event (e.g., a purchase event and/or an add to cart event), and/or other custom events defined by the partner. The partner may also configure the attribution time window for the events. The partner configurations may be stored in the partner configuration data store 202. The link system 106, persona system 100, and event handling system 104 may operate in a partner-specific manner according to the partner configuration data stored in the partner configuration data store 202.

The partner can request the creation of system URIs from the partner interface module 200. For example, the partner can use the partner dashboard and/or another interface (e.g., an API) provided by the partner interface module 200 to request system URIs for inclusion into system links 126. Using the partner dashboard, the partner may specify various operations and data to be associated with a system URI. For example, the partner may specify link analytics data, routing data, and other data. The link system 106 may generate and store a system link data object 602 (e.g., FIG. 6A) based on the operations and data specified by the partner. For example, the link system 106 (e.g., link generation module of FIG. 5) may generate a system URI and associate the system URI with link data generated based on the operations and data specified by the partner. The link system 106 may store the system link data object (e.g., FIG. 6A) in the link data store (e.g., FIG. 5).

The partner interface module 200 may return the system URI to the partner. The partner can include the system URIs in the partner's application/website 124, 131 or on another party's application/website, such as in an advertising network. For example, the partner may include the system URIs in user-selectable system links 126 (e.g., hyperlinks, graphical banners, or graphical overlays). As described herein, the system URI may be used by the user device 102 (e.g., web browser 136) to access the event handling system 104.

The partner interface system 108 includes an analytics data store 204 that stores partner analytics data indicating how the user devices 102 interact with the partner's system URIs, the partner's website 131, and/or the partner's application 124. Example data included in the partner analytics data store 204 may include attribution data indicating which events are attributed to other events, application installation data, application usage data, and website usage data. Additional types of data may include geographical data (e.g., the location of users using the partners' applications, websites, and/or links). The partner may retrieve data relating to individual events and/or aggregated data for multiple events. The partner device 112 can access (e.g., view/download) the partner analytics data via the partner dashboard.

Figure 3:
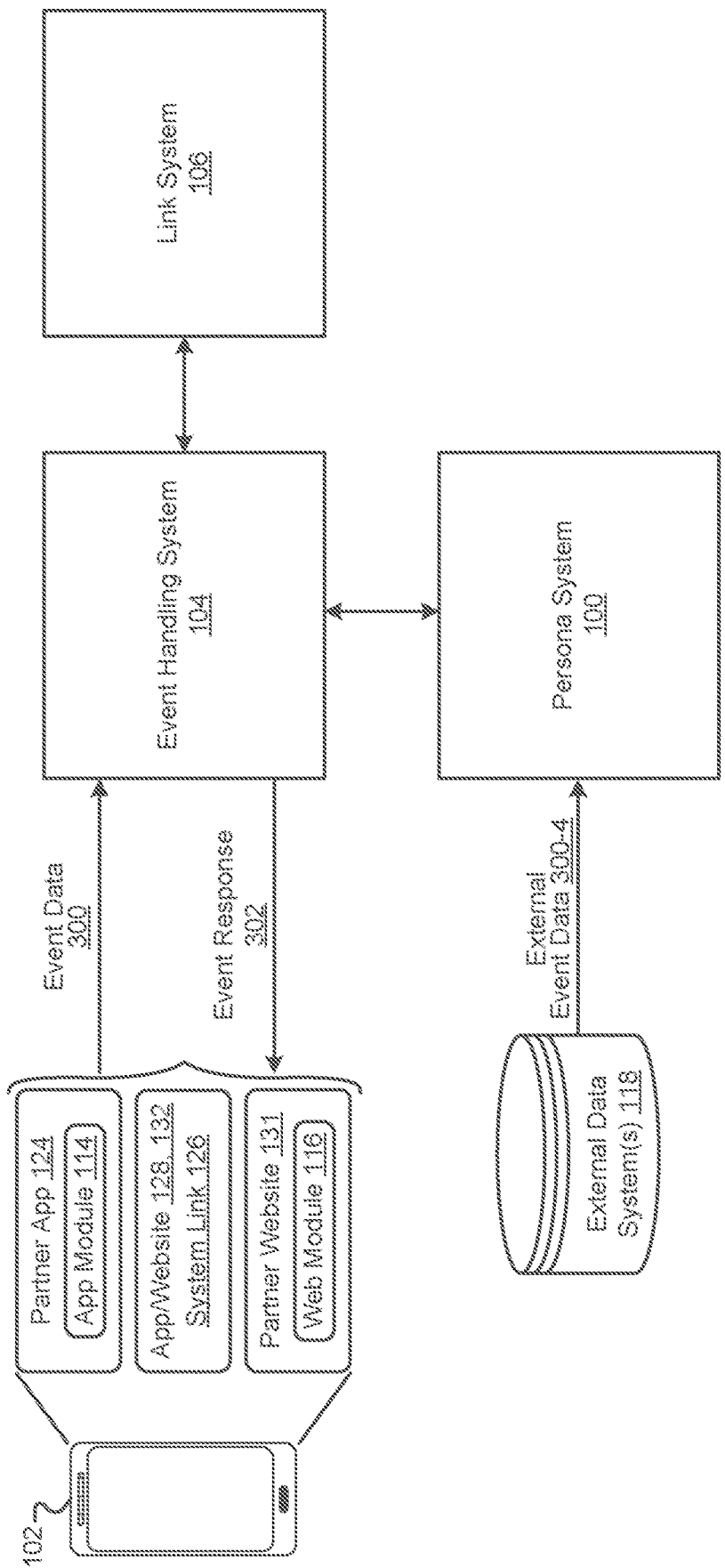
FIG. 3 is a functional block diagram that illustrates example interactions between a user device, an external data system, and components of the attribution system.
Figure 4:
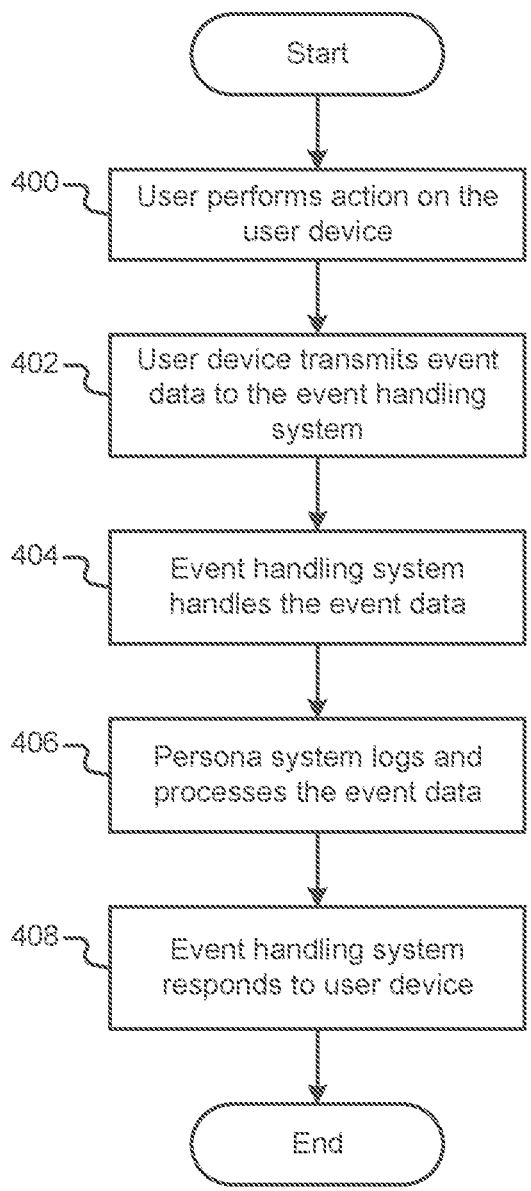
FIG. 4 illustrates a method describing interaction between the user device and components of the attribution system.

FIG. 3 is a functional block diagram that illustrates example interactions between the user device 102, an external data system 118, and components of the attribution system 110. FIG. 4 illustrates a method describing interaction between the user device 102 and components of the attribution system 110, as illustrated in FIG. 3. The user device 102, event handling system 104, link system 106, and persona system 100 of FIG. 3 may interact according to the method of FIG. 4 as follows. Initially, in blocks 400-402, a user may take an action on the user device 102 that generates event data 300 that is transmitted to the event handling system 104. The generation and transmission of event data 300 by the user device 102 in response to a user action may be referred to herein as an "event." In block 404, the event handling system 104 receives the event data 300 and determines how to handle the event data 300 (i.e., determines how to handle the event).

In block 406, the persona system 100 logs and processes the event data 300. For example, the persona system 100 may log the event data 300 by generating a new persona and/or updating an existing persona. In some implementations, the persona system 100 may perform matching operations on the generated/updated personas to determine whether the incoming event was generated by the same user device as a prior event. In cases where the persona system 100 determines that the incoming event was generated by the same user device as a previous event (e.g., a persona match occurred), the persona system 100 may attribute the incoming event to the prior event. For example, the persona system 100 may attribute the installation of an application to a prior user-selection of a system link (e.g., a link to a state of the application).

In block 408, the event handling system 104 handles the event and responds to the user device 102. For example, the event handling system 104 may handle the event and respond to the user device 102 based on communication with the persona system 100. In one example, if the persona system 100 has attributed an incoming event to a prior event, the event handling system 104 may handle the incoming event in a manner that depends on the prior event. In an example where the installation of an application is attributed to the prior user-selection of a system link, the event handling system 104 may route the newly installed application according to the system URI of the prior selected system link.

In some implementations, the event handling system 104 may handle the event and respond to the user device 102 based on communication with the link system 106. For example, if the event handling system 104 receives a system URI (e.g., event data indicating a click on a system link 126), the event handling system 104 can retrieve link data associated with the system URI from the link system 106. The event handling system 104 can then respond to the user device 102 according to the link data. For example, the event handling system 104 may route the user device 102 (e.g., redirect the web browser 136) according to the link data.

The response provided by the event handling system 104 to the user device 102 can vary, depending on a variety of factors described herein. In some cases, the event handling system 104 may route the user device 102 (e.g., web browser and/or application) in response to a received event. In some cases, the event handling system 104 may transfer data to the user device 102 in response to a received event. In some cases, the event handling system 104 may send an acknowledgement of receipt of the event. In other cases, the event handling system 104 may refrain from providing a response to the user device 102, or return a default response.

As illustrated in FIG. 3, in some implementations, the persona system 100 can receive external event data 300-4 from one or more external data systems 118. The persona system 100 may process the external event data 300-4 in a similar manner as the other event data received from the user device 102. For example, in response to receiving the external events 300-4, the persona system 100 may generate/update personas and perform matching operations on personas. The persona system 100 may also attribute external events to other events received via the event handling system 104. Additionally, the persona system 100 may attribute events received via the event handling system 104 to external events. In some implementations, the persona system 100 may match personas associated with external events using a pairing of the username and app name/ID in the case that the device ID is not present in an external event.

In some implementations, the event data 300 may include user identification data that identifies a user. User identification data may include a username/login. In some cases, the username may include an email address. The user identification data may identify a user with respect to a website/application. In one specific example, the username and app ID pair may identify a user uniquely with respect to the application/website associated with the app name/ID.

In some implementations, the personas may include source data that indicates the source of an event. As described herein, event data may be generated in response to a user action, such as a user interacting with a link, webpage, or application state. For example, event data 300 may be generated when a user views a webpage or application state, or when a user interacts with system links or other GUI elements included on a webpage or application state. The source data stored in the persona (e.g., on a per-event basis) may describe the network location and/or circumstances associated with the generation of the event data (e.g., the location where a link was viewed or selected). The ways in which the source data is determined may vary, depending on the type of event data generated. Example source data may indicate whether the event data is generated from a banner view/selection, a sharing event, an interstitial view/selection, a general page view, a marketing link, within an email, within a short message service (SMS) message, in a general advertisement, and/or in a social media location (e.g., in posts on FACEBOOK® by Facebook, Inc., or on TWITTER® by Twitter Inc.). In some implementations, the source data can identify an advertising campaign name (e.g., generated by a partner) associated with a link. In some implementations, the source data can be configured by the partner and stored in the link data (e.g., see FIG. 6A) and/or in the app/web module 114, 116. In some cases, the source data can indicate whether the event data came from the app/web module 114, 116, from a system link 126, and/or from external event data 300-4. In some cases, the source data can include the app name/ID. The source data may also include referral data (e.g., HTTP referer data) that indicates how the user accessed the webpage or application state in which the event took place. The source data may assist in determining which events are attributed to prior events.

Figure 5:
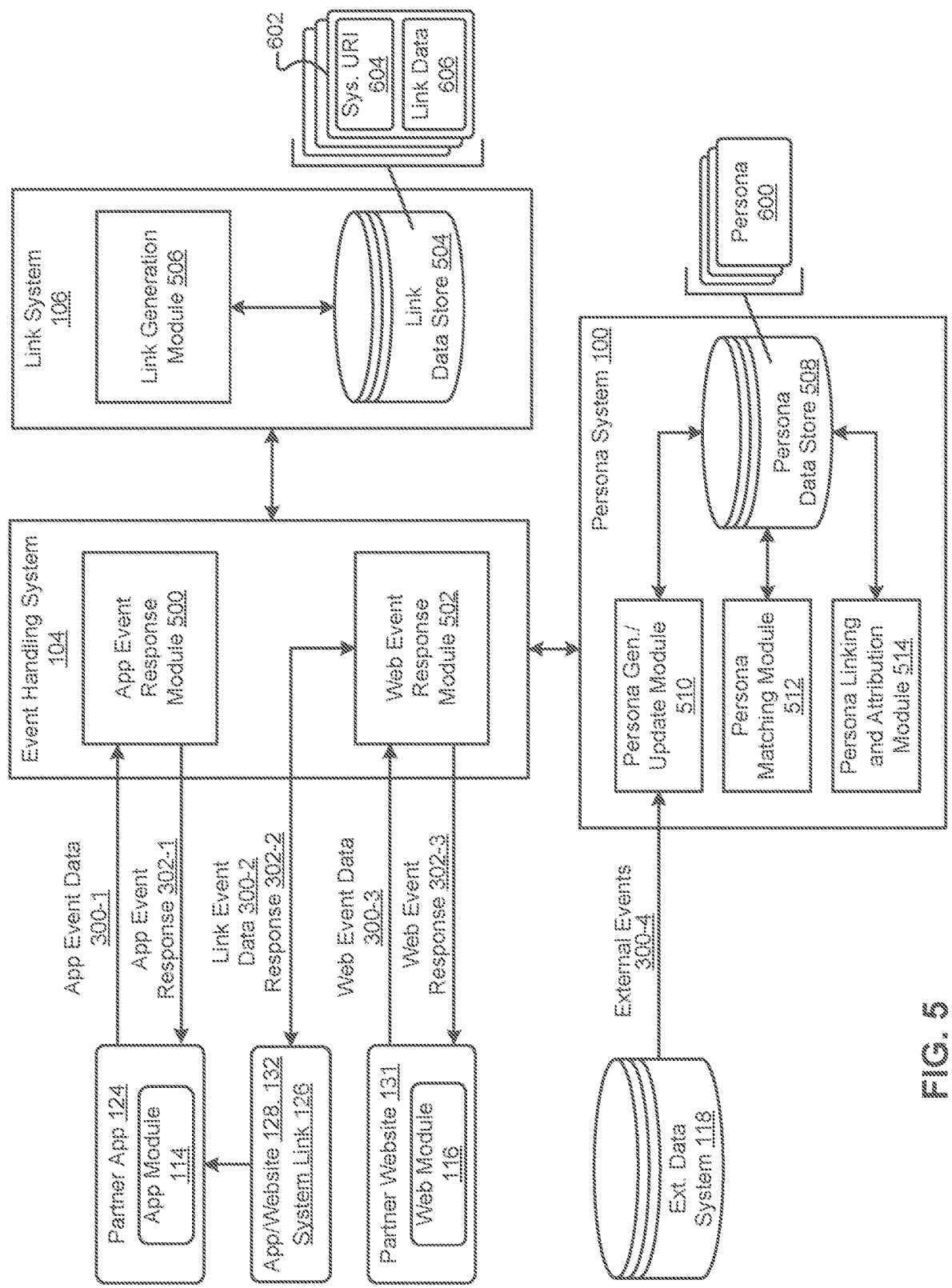
FIG. 5 illustrates more detailed examples of the event handling system, link system, and persona system.
Figures 6A, 6B:
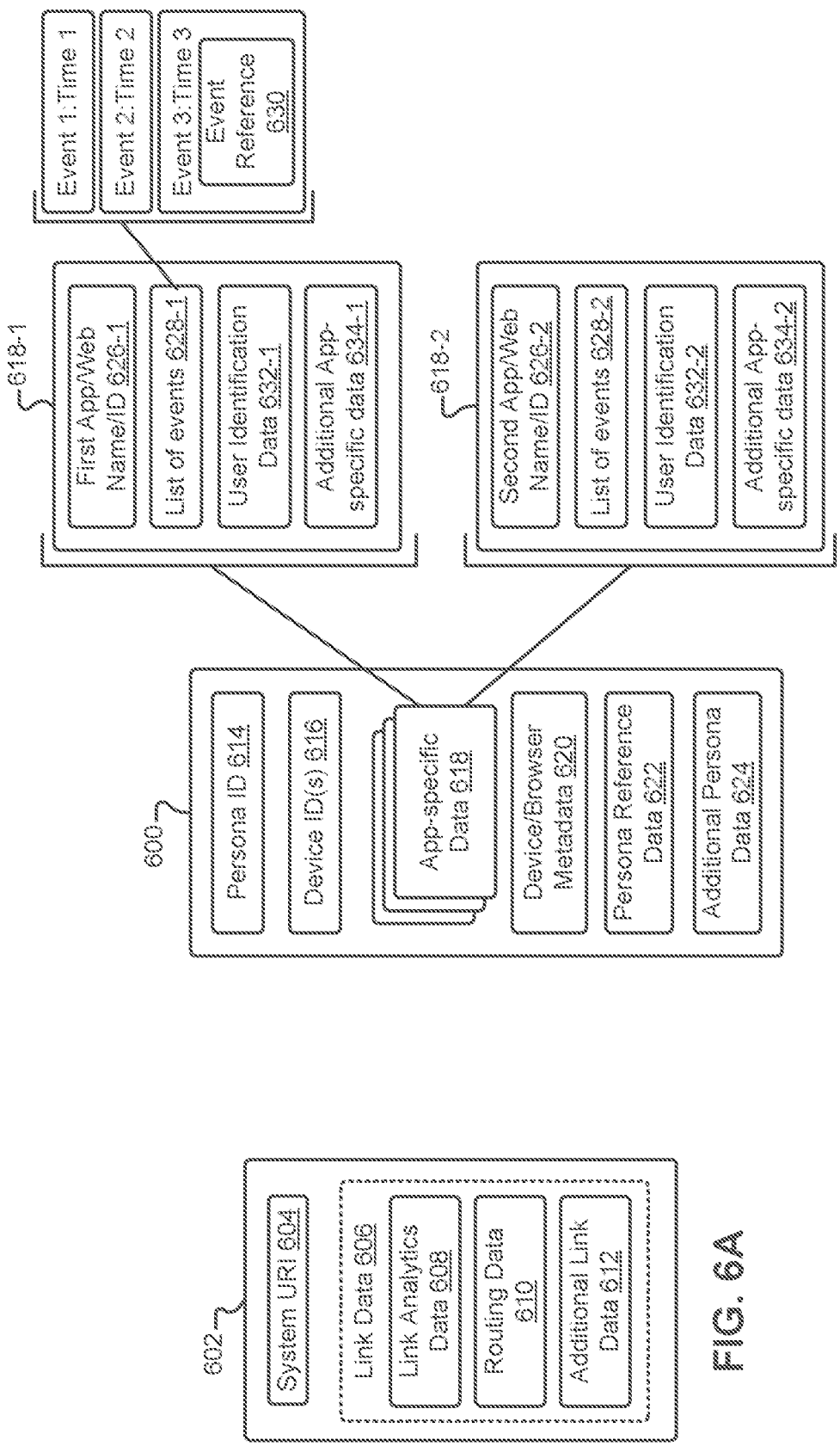
FIG. 6A illustrates an example system link data object.
FIG. 6B illustrates an example persona data object.

FIG. 5 illustrates more detailed examples of the event handling system 104, link system 106, and persona system 100. The event data 300 generated by the user device 102 may be characterized as application event data 300-1 ("app event data 300-1") or web event data 300-3. The characterization of events may depend on whether the event data is generated via user interactions with the web browser or other applications. Web events may generally originate from the web browser and may be associated with a web ID (e.g., a cookie ID). For example, web events may refer to events generated by the web module 116 of the partner's website 131. App events may generally originate from an application other than the web browser and may be associated with a device ID (e.g., a device ID other than a web ID, such as an advertising ID). For example, app events may refer to events generated by the app module 114 of the partner's application 124. Another type of event described herein is a link selection event that generates link data 300-2. The link selection event may be generated by the selection of a system link 126 on a partner's website/application or in another website/application. A link selection event may be characterized as either an app event or web event, depending on how the user device 102 handles the link selection. For example, a link selection event may be associated with a web ID or another device ID (e.g., an advertising ID), depending on how the user device 102 handles a link selection event. The event data received by the event handling system may be received as HTTP requests or HTTP secure (HTTPS) requests in some cases.

Web events may be associated with different types of device IDs than app events. For example, web event data 300-3 may include a web ID (e.g., a cookie ID), while app event data 300-1 may include a different type of device ID (e.g., an advertising ID). Accordingly, different types of device IDs may be associated with the same user device over time. Additionally, in some cases, a user may change the device IDs used by the user device. For example, the user may delete web IDs (e.g., cookie IDs) from the user device, which may cause different web IDs to be transmitted by the user device over time. As another example, the user may change advertising IDs on the user device, which may cause different advertising IDs to be transmitted by the user device over time.

A user device 102 may generate different types of device IDs for a variety of reasons. In some cases, user devices 102 can operate according to various restrictions (e.g., privacy/ permission restrictions) that designate which device IDs are accessible by specific applications. For example, in some cases, a web browser may be restricted from accessing or reporting a hardware device ID and/or an advertising ID for privacy reasons (e.g., since a web browser may not need access to such a device ID during operation). As another example, web IDs (e.g., a cookie ID) may be specific to a browser application, so if a user device has multiple web browser applications (e.g., Apple Inc.'s Safari browser and Google Inc.'s Chrome browser), each of the browser applications may use their own cookie ID domain. As another example, different websites visited within a browser application may use different web IDs. Furthermore, HTTP and HTTPS connections may be considered separate domains that may not share the same web ID in some cases.

The event handling system 104 includes an app event response module 500 (hereinafter "app response module 500") that receives and handles the app events. In some implementations, the app response module 500 may transmit an app event response 302-1 to the user device 102. The event handling system 104 includes a web event response module 502 (hereinafter "web response module 502") that receives and handles the web events. The web response module 502 may transmit a web event response 302-3 to the user device. The app response module 500 and/or the web response module 502 may handle link events (e.g., by sending a link event response 302-2), depending on a variety of factors described herein, such as how the user device 102 is configured to handle selection of a system link 126.

The user device 102 may transmit app event data 300-1 (e.g., according to the app module 114) in response to a variety of different user actions. For example, the user device 102 may transmit app event data 300-1 in response to: 1) an application being opened (referred to as an "app open event"), 2) the user closing the application (referred to as an "app close event"), 3) the user adding an item to a shopping cart or the user purchasing an item (referred to generally as "application commerce events"), 4) the user opening the application after installation (referred to as an "app installation event"), 5) the user opening the application after reinstallation (referred to as an "app reinstallation event"), 6) the user requesting that a system URI be created by the link system 106 and transmitted back to the user device (e.g., in order to share content), 7) a user accessing a state of the application (e.g., an app page), 8) a user performing an action that the app module 114 has been configured by the operator of the attribution system to report, and 9) the user performing any other action that the app module 114 has been configured by the partner to report to the attribution system 110 (i.e., a custom event defined by the partner). For example, a partner may define custom events to indicate that a specific application state (e.g., application page) or specific piece of content is viewed or shared.

The app module 114 may be configured to generate a variety of different app events. As such, the above list of app events is only an example list of possible app events. In some implementations, the app module 114 may be configured to generate the above app events or different app events.

The app event data 300-1 transmitted by the user device 102 and received by the app response module 500 may include, but is not limited to: 1) a device ID (e.g., an advertising ID, hardware ID, etc.), 2) an application name/ ID (referred to herein as "app name/ID" or "app ID") that indicates the application with which the app event data 300-1 is associated, 3) user identification data that identifies a user of the app (e.g., a username), 4) source data indicating the source of the event data, and 5) device metadata (e.g., user agent data), such as an IP address, OS identification data (e.g., OS name, OS version), device type, and screen resolution. The app event data 300-1 may also include an event identifier that indicates the type of event. For example, the event identifier may indicate whether the app event is an app open event, an app close event, an app installation event, an app reinstallation event, a commerce event (e.g., an add to cart event or a purchase event), or a custom event that may be defined by the developer in the app module 114. In the case the app event is an app open event that resulted from user-selection of a link (e.g., a system link 126), additional app event data may be transmitted by the user device, such as the URI (e.g., a system URI) that caused the user device to open the application. In some cases, described herein with respect to the method of FIG. 11, the app event data 300-1 may also include a web ID (e.g., appended to the system URI) associated with the URI.

The app response module 500 may perform a variety of different operations in response to receiving app event data 300-1. For example, the app response module 500 may: 1) timestamp the received app event data 300-1 (or use a received timestamp), 2) determine the source of the app event, 3) pass the app event data 300-1 to the persona system 100 for logging by the persona system, 4) make a request to the persona system 100 to determine if the app event can be attributed to any previous event, and/or 5) determine whether an app open event is an install event or a reinstall event (e.g., based on data included in the persona system 100 and/or the app event data 300-1). In the case the app response module 500 receives a system URI, the app response module 500 may acquire link data associated with the system URI. In the case the app response module 500 receives a link generation request, the app response module 500 can request that a system link data object 602 be generated by the link system 106. The link system 106 may generate the system link data object 602 and the app response module 500 can transmit the system URI back to the user device 102.

The user device 102 may transmit web event data 300-3 (e.g., according to the web module 116) in response to a variety of different user actions. For example, the user device 102 may transmit web event data 300-3 in response to a user accessing a webpage (referred to as a "webpage view event"). Accessing a webpage may be the start of a web session (e.g., the first webpage access on the site) or a subsequent page view. The user device 102 may also transmit web event data 300-3 in response to the user adding an item to a shopping cart or the user purchasing an item (referred to generally as "web commerce events"), the user requesting that a system URI be created by the link system 106 and transmitted back to the user device 102 (e.g., in order to share content), a user performing an action that the web module 116 has been configured by the operator of the attribution system 110 to report, and the user performing any other action that the web module 116 has been configured by the partner to report to the attribution system 110 (i.e., a custom web event defined by the partner). For example, a partner may define custom events to indicate that a specific webpage or specific piece of content is viewed or shared.

The web event data 300-3 transmitted by the user device 102 and received by the web response module 502 may include, but is not limited to: 1) a web ID, 2) the website name/ID, which may correspond to the app name/ID or app ID in the persona system, and 3) device/browser metadata (e.g., user agent data), such as IP address, OS identification data (e.g., OS name, OS version), device type, and screen resolution. The device/browser metadata may be extracted from the user agent sent by the web browser 136. The web event data 300-3 may also include user identification data that identifies a user of the website (e.g., a username), source data indicating the source of the web event data 300-3, and an event identifier that indicates the type of event. For example, the event identifier may indicate whether the web event is a webpage view event, a commerce event, a link creation event, a sharing event, or a custom event defined by the developer in the web module 116.

The web response module 502 may perform a variety of different operations in response to receiving web event data 300-3. For example, the web response module 502 may: 1) timestamp the received web event data 300-3 (or use a received timestamp), 2) determine the source of the web event, 3) pass the web event data 300-3 to the persona system 100 for logging by the persona system 100, and/or 4) make a request to the persona system 100 to determine if the web event can be attributed to any previous event. In the case the web response module 502 receives a link generation request, the web response module 502 can request that a system link data object 602 be generated by the link system 106. The link system 106 may generate the system link data object 602 and the web response module 502 can transmit the system URI back to the user device 102. The web response module 502 may also set a web ID on the user device 102 in the case the web browser 136 does not include a web ID.

The user device 102 may transmit link event data 300-2 in response to a user selecting a system link 126 (e.g., clicking or tapping the system link 126). User selection of the system link 126 may be handled by the user device 102 in a variety of ways, depending on how the user device 102 is configured (e.g., see FIG. 11). In some cases, selection of a system link 126 may cause an application to open, in which case the selection of the system link 126 (e.g., the system URI) is passed to the app response module 500 in the app open event. In other cases, the selection of a system link 126 is handled by the web browser 136, which accesses the web response module 502 using the system URI associated with the system link 126. Although not illustrated, in some implementations, the event handling system 104 may include a link handling module that handles incoming link events.

In implementations where the web browser 136 accesses the web response module 502 in response to user selection of a system link 126, the link event data 300-2 may include a web ID and device/browser metadata. The device/browser metadata (e.g., user agent data) may include an IP address, OS identification data (e.g., OS name, OS version), device type, and screen resolution.

The web response module 502 may perform a variety of different operations in response to receiving link event data 300-2, including, but not limited to: 1) timestamping the received link event data 300-2 (or using a received timestamp), 2) determining the source of the link event data 300-2, 3) passing the link event data 300-2 to the persona system 100 for logging by the persona system 100, 4) accessing the link data store 504 to retrieve link data for the received system URI, 5) routing the user device 102 to a location (e.g., a digital distribution platform 122 for downloading the application, a default site, or other site) based on the retrieved link data, and 6) setting a web ID in the case the web browser does not include a web ID.

The link system 106 includes a link generation module 506 and a link data store 504. The link generation module 506 may generate a system URI and link data in response to a link generation request. The link data may be used by the event handling system 104 to route user devices and track user analytics associated with the selection of system links 126.

The partner, or a user device 102 (e.g., app/web module 114, 116), can request system URIs from the link generation module 506. In the request, the partner (or the user device 102) can specify operations and data to be associated with a system URI. The request for a system URI that also specifies operations and data to be included with the system URI in a system link data object 602 may be referred to herein as a "link generation request." The link generation module 506 may generate a system URI in response to the link generation request. The link generation module 506 may store the system URI 604 and the associated link data 606 as a system link data object 602 (see FIG. 6A) in the link data store 504. The link data store 504 may store a plurality of link data objects 602 for each partner.

The system URI 604 may include a domain name (e.g., example.com or www.example.com) and a path (e.g., example.com/path_segment1/path_segment2/). The domain name and path can be used to access the system link data object 602 associated with the system URI 604 via the network 120. For example, a web browser 136 may generate a link event that accesses the event handling system 104 using the system URI 604. The event handling system 104 may then handle the link event based on the link data 606 associated with the received system URI 604. In some cases, the scheme for the system URI 604 may be a web uniform resource locator (URL) using http, or another scheme, such as ftp.

The user device 102 may handle a system link 126 associated with a system URI 604 in a variety of different ways. In some implementations, the user device 102 may handle the system URI 604 using the web browser 136. In this implementation, the browser 136 may access the event handling system 104 using the system URI 604. In other implementations, an application installed on the user device 102 may handle the system URI 604. For example, the user device 102 (e.g., the OS) may recognize the system URI 604 (e.g., the domain and/or path) as being a system URI that is handled by an application installed on the user device 102. In this case, the user device 102 (e.g., the OS) may launch the application and pass the system URI 604 to the launched application. In this case, the application may transmit the system URI 604 to the event handling system 104 in an app open event. Examples of user devices and OSs that may recognize link formats and launch applications from selected links may include 1) devices running the IOS® operating system that recognize Universal Links and 2) devices running the ANDROID® OS operating system that recognize Android App Links.

The link data 606 may include a variety of data, such as link analytics data 608 and link routing data 610. Link analytics data 608 may include data used by the partner to track the performance of the system link, such as how many times the system link is selected and where the system link is being selected. For example, the analytics data 608 can include tags specified by the partner that indicate a campaign name (e.g., an advertising campaign name), an application name, and/or a channel (e.g., website) with which the system link is associated (e.g. a website including the system link). Routing data 610 may include data that is used by the event handling system 104 (e.g., the web response module 502) to direct the user device 102 (e.g., web browser) in response to selection of the system link 126. For example, the partner may specify that the system link should route the user to a digital distribution platform 122 to download an application in response to the user selecting a system link associated with an application that is not installed on the user device 102. The link data 606 can also include additional link data 612 described herein.

In some implementations, the link system 106 may generate a system link data object 602 in response to a link generation request from a user device 102. For example, if a user decides to share application content with another user (e.g., by selecting a share button), the user device 102 (e.g., app module 114) may transmit an app event (e.g., a share event) including a link generation request. The event handling system 104 receives the share event with the link generation request, has a system URI generated by the link generation module 506, and transmits back the generated system URI 604 for the user to share. Selection of a system link 126 including the system URI 604 may lead to a variety of outcomes, depending on how the link data 606 associated with the system URI 604 is configured. For example, selection of the system URI may lead to the application content if the user has the app installed, lead to a digital distribution platform 122 if the application is not installed, or lead to a website including similar content as the application.

The persona system 100 includes a persona data store 508, a persona generation/update module 510 (hereinafter "persona generation module 510"), a persona matching module 512, and a persona linking and attribution module 514 (hereinafter "persona attribution module 514"). The persona data store 508 stores personas 600. An example persona 600 is illustrated in FIG. 6B.

The persona generation module 510 generates and updates personas 600 in response to event data 300 being received by the event handling system 104. For example, the persona generation module 510 may generate a new persona for event data that includes a new device ID (e.g., a device ID not included in a currently existing persona). In the case event data includes a device ID that is already included in an existing persona, the persona generation module 510 may update the persona based on the incoming event data. The persona generation module 510 may process event data 300 before storing the event data 300 in personas 600 (e.g., instead of storing all received event data 300). For example, the persona generation module 510 may select portions of event data 300 for storage in a persona 600. In some implementations, the persona generation module 510 may normalize some of the received event data 510 (e.g., device types/names, OS names, etc.). Although not illustrated, the username and app ID may be used to generate and match personas in cases where device IDs are not included in event data 300 (e.g., in external event data 300-4).

FIG. 6B illustrates an example persona 600. Each persona 600 may include data related to a single user, such as a single user associated with one or more user devices. In some cases, the persona data store 608 may include a single persona for a single user device. In other cases, the persona data store 608 may include multiple personas for the same user (e.g., the same user device). Such a case may occur when a user device has used multiple device IDs that are not yet combined into a single persona. In some cases, the persona data store 508 may include multiple personas for the same user that is using multiple devices (e.g., a desktop device and one or more mobile devices, such as a tablet and smartphone).

The persona 600 may include a persona ID 614 that can be assigned by the persona generation module 510 to uniquely identify the persona 600 among other personas in the persona data store 508. The persona 600 may also include one or more device IDs 616 (e.g., one or more web IDs and/or one or more advertising IDs). In some cases, the persona 600 may include a single device ID (e.g., a single cookie ID or a single advertising ID). In other cases, the persona 600 may include multiple device IDs. For example, the persona 600 may include one or more cookie IDs and one or more advertising IDs. As another example, the persona 600 may include multiple cookie IDs, but not include any advertising IDs. As another example, the persona 600 may include multiple advertising IDs, but not include any cookie IDs. In some implementations, the device IDs 616 may act as primary indexes for the persona 600.

The persona 600 may include one or more app-specific data structures 618 (e.g., 618-1, 618-2). The app specific data structures 618 include data that is specific to an application and/or website (e.g., specific to a partner's application and corresponding website). FIG. 6B illustrates two example app-specific data structures 618-1, 618-2 (e.g., for first and second apps/websites). The persona 600 may also include device/browser metadata 620 (e.g., user agent data), such as IP address, OS identification data (e.g., OS name, OS version), device type, and screen resolution. The persona may also include persona reference data 622 that includes references to one or more other personas (e.g., persona IDs and/or device IDs) that are likely associated with the same user device.

The persona 600 may also include additional persona data 624 including, but not limited to, geographic data associated with the user (e.g., a last geo-location associated with the user), a list of devices used by the user (e.g., one or more mobile devices and/or desktop devices), and additional data that may be derived from the app-specific data 618 (e.g., the first time the user was seen, the last OS used, the last link selection event).

The app-specific data for a single application may include data indicating how the user has used the application and/or the corresponding website. App-specific data 618-1, 618-2 is illustrated in FIG. 6B for a first application and a second application. The app-specific data 618 may include the application/website name/ID 626-1, 626-2 (hereinafter app name/ID). This ID identifies the application and/or corresponding website associated with the app-specific data 618. The app-specific data 618 may also include a list of events 628-1, 628-2 for the application/website. The list of events 628-1, 628-2 can include app events, web events, and/or link selection events. The events can be stored in a tuple format indicating the name of the event and a timestamp associated with the event (e.g., [name of event:timestamp]). For example, the list of events 628-1 includes three events with three associated time stamps. In some implementations, the event data may include an event type indicator that indicates whether the event is a web or app event. In some cases described herein, an event can be attributed to a prior event. In these cases, the prior event and/or subsequent event can include a reference to the other event. For example, the subsequent event can include a reference to the prior event. The event reference can reference another event in the same persona or the event can be included in a different persona. Event 3 in FIG. 6B includes an event reference 630.

The app-specific data 618 can include user identification data 632-1, 632-2 (e.g., a username). In some implementations, the persona 600 may be indexed by the combination of username and app ID (e.g., an attribution system assigned app ID). The app-specific data 618 can also include additional app-specific data 634-1, 634-2, some of which may be derived from the list of events 628 for the app/website.

Additional app-specific data 634 may include, but is not limited to, a) a timestamp indicating the most recent usage of the app/website, b) a timestamp indicating the last time the app/website was accessed on a mobile device, c) a timestamp indicating the last time the app/website was accessed on a desktop device, d) activity data that indicates how often and when the app/website was used over a period of time (e.g., which days the app/website was used over a predetermined number of previous days), e) activity data that indicates how often the app/website was used on a mobile device, f) activity data that indicates how often the app/website was used on a desktop device, and g) a timestamp indicating the first time the user used the app/website (e.g., an earliest event in the list of events).

Figure 7:
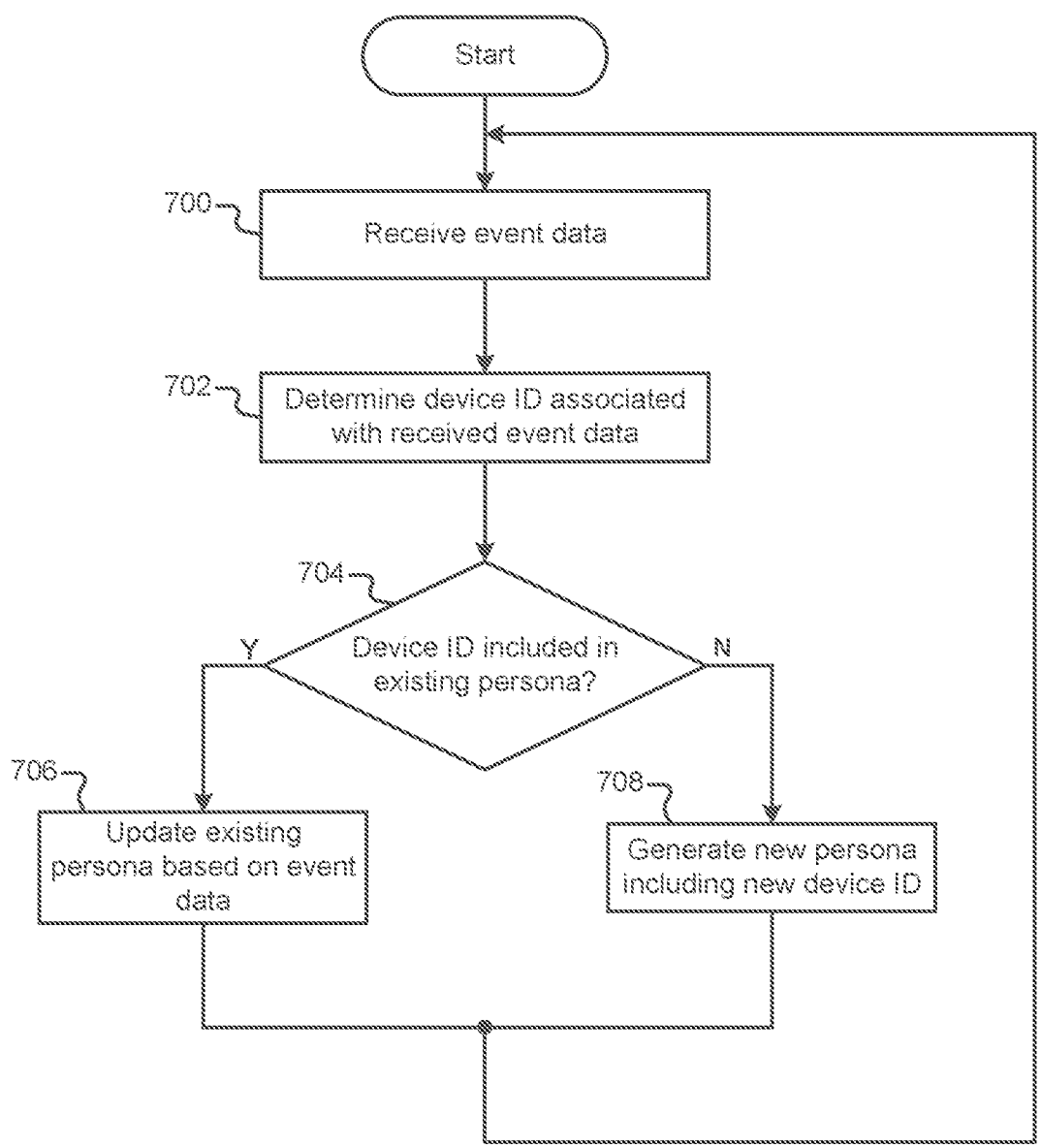
FIG. 7 illustrates an example method for generating and updating persona data objects in the persona data store.

FIG. 7 illustrates an example method for generating and updating personas 600 in the persona data store 508. FIG. 8 is a functional block diagram that illustrates generation and updating of personas 800-1, 800-2, 800-3 in the persona data store 508. In FIG. 8, the event handling system 104 and some components of the persona system 100 have been omitted for clarity. The example illustrated in FIG. 8 may represent the case where the second user device 802-2 selects a system link to an application that is not currently installed on the second user device 802-2, which may cause the second user device 802-2 to transmit a link event (e.g., via the web browser) to the event handling system 104. The second user device 802-2 may be redirected, via the web browser, to a digital distribution platform 122 to download the application. After installation of the application, the second user device 802-2 may open the application and generate app event data 2 806-2. As described with respect to FIGS. 9-10, the app open/installation event can be attributed to the prior link event.

The method of FIG. 7 is now described with respect to the functional block diagram of FIG. 8. Initially, in block 700, the persona generation module 510 receives event data 300. For example, the persona generation module 510 may receive event data 300 from the event handling system 104 (e.g., the web response module 502 and/or the app response module 500) and/or the external data system 118. In block 702, the persona generation module 510 determines the device ID associated with the received event data 300. In block 704, the persona generation module 510 determines whether the device ID is included in any existing personas. If the device ID is included in an existing persona, the persona generation module 510 updates the existing persona based on the existing event data in block 706. For example, persona generation module 510 may update the app-specific data of the existing persona to include the incoming event in a list of event data for the application/website. The persona generation module 510 may also update additional information in the persona, such as the source data for the updated events and/or other metadata data associated with the events, such as a product associated with the event or a topic associated with the event. If the device ID is not included in existing personas, then the persona generation module 510 may generate a new persona for event data including the new device ID in block 708.

With respect to FIG. 8, the persona generation module 510 receives web event data 1 804-1 and app event data 1 806-1 from the first user device 802-1. The persona generation module 510 determines that the persona data store 508 includes existing persona 1 800-1 that is associated with web ID 1 and device ID 1. The persona generation module 510 updates persona 1 800-1 (e.g., the app-specific data of existing persona 1) using the web event data and app event data received from the first user device 802-1.

Additionally, in FIG. 8, the persona generation module 510 receives web event data 2 804-2 from a second user device 802-2 and subsequently receives app event data 2 806-2 from the second user device 802-2. In response to receiving the web event data 2 804-2 from the second user device 802-2, the persona generation module 510 determines that the persona data store 508 does not include a persona associated with web ID 2. The persona generation module 510 generates new persona 2 800-2 illustrated in FIG. 8. New persona 2 800-2 includes app-specific data 808 indicating that the user made a link selection at time T1. In response to receiving the app event data 2 806-2 from the second user device 802-2, the persona generation module 510 determines that the persona data store 508 does not include a persona associated with device ID 2. The persona generation module 510 generates new persona 3 800-3 illustrated in FIG. 8. New persona 3 800-3 includes app-specific data 810 indicating that the user opened an application (e.g., for the first time) at timestamp T2.

Referring to FIG. 5, the persona matching module 512 can determine whether two different personas (e.g., having different device IDs) are associated with the same user device. For example, the persona matching module 512 may determine that two personas are associated with the same user device based on data included in the personas. Data used to determine whether two personas match may be referred to herein as "matching data." Example matching data may include device/browser metadata, such as IP address, device OS name/version, device type, screen resolution, and browser type. Additional example matching data may include event timestamps, app name/IDs, and user identification data (e.g., usernames). In some implementations, the persona matching module 512 may perform matching operations in response to newly created personas. For example, the persona matching module 512 may attempt to match each newly created persona with another existing persona in response to creation of the new persona. In some implementations, the persona matching module 512 may match personas in batches instead of attempting to match for each newly generated persona. In these implementations, the persona matching module 512 may attempt to match personas at predetermined times and/or after a predetermined number of personas have been generated.

The persona attribution module 514 updates personas based on the outcome of matching between personas. For example, the persona attribution module 514 may link matching personas (e.g., by adding persona reference data). Additionally, the persona attribution module 514 may markup events within personas (e.g., the same persona or linked personas) that may be attributed to one another (e.g., using event references). In response to a match between two personas, the persona attribution module 514 can update one or both personas to include a reference to the other persona indicating that the two personas matched (e.g., belong to the same user device). In some implementations, the personas may include lists of events. In these implementations, the persona attribution module may update the persona (e.g., an event in app-specific data) to indicate which specific event matches the prior event in the already existing persona. In some cases, the event data indicates that the subsequent event is attributed to the prior event.

In some implementations, instead of adding persona references to other personas indicating that the two personas are from the same user device, the persona attribution module 514 can combine the data included in the two personas to form a single persona. In these implementations, the persona attribution module may delete instances of the earlier personas in some cases.

In some implementations, the persona generation module 510 may delete personas associated with device IDs that have been stored for greater than a threshold amount of time, or have been inactive for a threshold amount of time (e.g., the persona has not been modified for greater than a threshold amount of time).

In some implementations, the persona matching module 512 may determine a matching score for a pair of personas that indicates the likelihood that the two personas are associated with the same user device. In these implementations, the persona attribution module 514 may update the personas depending on the outcome of the matching (e.g., based on a matching score). For example, the persona attribution module 514 may add references to personas having greater than a threshold matching score. The persona attribution module 514 may refrain from adding references to personas having less than the threshold matching score. In some examples, the persona system 100 (e.g., persona generation module 510) may combine personas having greater than a threshold matching score. A match between personas based on a matching score, such as a matching score that is greater than a threshold matching score, may be referred to herein as a "probabilistic match."

The persona attribution module 514 may return attribution data indicating which personas matched and which events matched. For example, the persona attribution module 514 may return attribution data to the event handling system 104 for the event handling system 104 to use in responding to an event. As another example, the persona attribution module 514 may return the attribution data to the partner interface system 108 to be stored in the partner analytics data store 204 for partner evaluation.

FIG. 9 illustrates an example method for matching personas and attributing an event within a persona to prior event in another persona. FIG. 10 is a functional block diagram that illustrates the persona matching module 512 matching two personas 800-2, 800-3. Additionally, FIG. 10 illustrates attribution of an app installation event to a previous link selection. The method of FIG. 9 is now described with respect to the functional block diagram of FIG. 10.

Initially, in block 900, the persona matching module 512 selects a first persona for matching. In some implementations, the persona matching module 512 may attempt to match any newly generated persona to existing personas and then attempt to attribute an event in the new persona to an event in the matched persona. In these implementations, the persona matching module 512 may perform matching operations described herein for personas as the personas are received in real-time. In other implementations, the persona matching module 512 may perform matching operations for a batch of new personas.

In blocks 902-904, the persona matching module 512 selects a different persona and performs a matching operation based on data included in the two selected personas. For example, the persona matching module 512 may determine whether two personas match based on comparisons of matching data included in the personas, such as IP address, device OS name/version, device type, screen resolution, browser type, and user identification data. If the two personas do not match in block 906, the persona matching module 512 may select another persona to attempt to match to the first persona. If the two personas match, the persona attribution module 514 may modify one or more of the selected personas in block 908 (e.g., by adding references to personas and/or combining personas). For example, the persona attribution module 514 may update the newly generated persona to include a reference to the older persona. In some cases, the persona attribution module 514 may attribute an event from the newly generated persona to an event in the older persona and generate event references accordingly.

Referring now to FIG. 10, new persona 3 800-3 and new persona 2 800-2 were generated as described with respect to FIG. 8. Specifically, it can be assumed that new persona 2 800-2 was generated at T1 before new persona 3 800-3 was generated at T2. It may also be assumed that the persona matching module 512 did not find a match between persona 2 800-2 and the additional personas 812 already included in the persona data store 508. In response to the generation of new persona 3 800-3, the persona matching module 512 may select personas from the persona data store 508 in an attempt to identify a persona that matches new persona 3 800-3. After selecting new persona 3 800-3 for matching, the persona matching module 512 may determine that new persona 3 800-3 and new persona 2 800-2 match. For example, the persona matching module 512 may determine that new persona 2 800-2 and new persona 3 800-3 match based on device/browser metadata, user identification data, and other data associated with persona 2 800-2 and persona 3 800-3. In one specific example, the persona matching module 512 may determine that new persona 2 800-2 and new persona 3 800-3 match because they are associated with the same IP address, device OS name/version, device type, screen resolution, and/or browser type. In this specific example, the device/browser metadata may match because the metadata came from the same user device 802-2 (e.g., see FIG. 8).

In response to the persona matching module 512 determining that new persona 2 800-2 matches new persona 3 800-3, the persona attribution module 514 modifies persona 2 800-2 and persona 3 800-3 to include references to one another. The persona attribution module 514 also modifies the event included in new persona 3 800-3 to reference the event included in new persona 2 800-2. For example, as illustrated in FIG. 10, the persona attribution module 514 modified the open/install app event data 1000 for new persona 3 800-3 to include an attribution reference to the link selection event 808 of new persona 2 800-2. As described with respect to FIG. 8, the example of FIG. 10 may represent the case where the second user device 802-2 selects a link to an application that is not currently installed on the user device 802-2, which may cause the second user device 802-2 to transmit a link event to the event handling system 104. The link event resulted in the generation of new persona 2 800-2. The second user device 802-2 was redirected to a digital distribution platform 122 to download the application. After installation of the application, the second user device 802-2 opened the application to generate app event data 2 806-2 that resulted in the generation of new persona 3 800-3. The persona matching module 512 matched new persona 2 800-2 to new persona 3 800-3. The persona attribution module 514 then modified the event data of new persona 3 800-3 to indicate that the app open/installation event is attributed to the prior link selection event.

In some implementations, the persona matching module 512 may select personas for matching based on a time window in which the personas are generated (e.g., a time window in which the event data was received). For example, after receiving event data and generating a new persona, the persona matching module 512 may select one or more existing personas to match with the new persona based on the time the existing personas were created. In this example, the persona matching module 512 may define a time window (e.g., in minutes, hours, days, etc.) and select existing personas that were generated within the time window relative to the new persona. In a more specific example, if the persona matching module 512 is configured to match personas within a two hour time window, the persona matching module 512 may select personas for matching with a new persona if the existing personas are timestamped less than (or equal to) two hours from the time the new persona was timestamped.

In some implementations, the persona matching module 512 may select personas for matching based on IP addresses associated with the personas. For example, after generating a new persona, the persona matching module 512 may select one or more existing personas to match with the new persona based on the IP addresses associated with the new persona and the existing personas. In this example, the persona matching module 512 may select one or more personas from the existing personas for matching if the existing personas include the same IP address as the new persona.

In some implementations, the persona matching module 512 may determine the matching score between two personas based on the number of potential additional persona matches. For example, in cases where multiple personas include similar device/browser metadata, a plurality of possible matches between the personas may be possible. In these cases, the matching score may reflect the ambiguity present in persona matching. For example, a matching score may be lower for scenarios where a greater number of matches are possible. In one specific example, a matching score may be inversely proportional to the number of possible matches (e.g., 1 divided by the total number of possible matches). In general, more specific matching data (e.g., more specific OS name/version, device type) may yield less ambiguity when matching personas. In some implementations, the persona matching module 512 may assign values, such as decimal values, to matches in specific matching data (e.g., matches in device type, screen resolution, OS, etc.). In some implementations, the persona matching module 512 may assign different weighting values to different types of matching data.

The matching score may be stored with the persona reference. The persona matching module 512 may update the persona matching scores over time as new matching data becomes available. For example, if additional event data is received that indicates that two personas are more likely associated with one another, the persona matching module may update the matching scores associated with the personas.

In implementations where the persona matching module 512 determines a matching score for two personas, the persona attribution module 514 may use a threshold matching score value to determine whether a match between two personas can be considered for attribution. For example, the persona matching module 512 may initially determine a matching score for two personas. Then, the persona attribution module 514 may determine whether the matching score is greater than a threshold value. The persona attribution module 514 may consider the match between the two personas for attribution in cases where the matching score is greater than, or equal to, the threshold value. Otherwise, the persona attribution module 514 may refrain from attributing one event to a prior event if the matching score is less than the threshold value. In some implementations, the partners and/or the operator of the attribution system may configure one or more threshold matching scores. For example, the partner may set one or more threshold matching score that are specific to applications and/or types of attributions (e.g., install attributions, app open attributions, etc.). In some implementations (e.g., see FIG. 18), there may be ambiguity among which personas are associated with the same user device. For example, multiple personas (e.g., web IDs and device IDs) may possibly be matched to one another based on associated matching scores that are greater than a threshold matching score. In these cases, the persona attribution module 514 can select specific personas for attribution based on a variety of factors, such as the highest matching score and/or the time at which the persona was generated.

As described herein, a persona may represent user activity across one or more user devices (e.g., smartphone, tablet, desktop, or other computing devices). In some cases, a user may login to the same website/app on different user devices. In these cases, personas having different device IDs may be generated for the different user devices, but the personas may include the same user identification data (e.g., the same combination of username and app ID). The personas across user devices may be matched based on the matching user identification data, instead of other device/browser metadata.

The persona matching module 512 may refrain from matching personas in the case where the personas include inconsistent data (e.g., contradictory data). For example, the persona matching module 512 may refrain from matching personas if the IP addresses, the device OSs, device types, or other device/browser metadata is inconsistent (e.g., contradictory), such that the data was not likely generated by the same user device. In some cases, the device/browser metadata generated by the same user device may be different (e.g., not exactly the same). For example, the device/browser metadata generated by the app module 114 may be different than the device/browser metadata generated by the web module 116 and/or included with a link selection. Some examples of differing device/browser metadata include variations in the reported device OS name and device type. The persona matching module 512 may learn the variations between device/browser metadata and account for the variations when performing matching operations.

The persona matching module 512 may determine whether two personas are from the same user device based on the IP addresses associated with the personas. In some implementations, the persona matching module 512 may determine whether two personas match based on the frequency with which the IP addresses are used. For example, the persona matching module 512 may refrain from matching personas if there are too many personas (e.g., greater than a threshold number) associated with a single IP address since high traffic areas can result in similar devices/browsers (e.g., false matches). In some cases, the persona matching module 512 may compute the matching score based on the number of incidents of a single IP address (e.g., lower the score for a greater number of IP addresses). In some implementations, the persona matching module 512 may store a value indicating the traffic level associated with an IP address, such as a count of IP addresses with incoming events and/or a count of IP addresses over time (e.g., a rate of IP addresses). In other implementations, the traffic level associated with an IP address can be determined on a per-batch basis (e.g., when persona matching is done on a per batch basis).

In general, any type of event may be attributed to any other type of event. For example, link selection events may be attributed to other events, and vice versa. In some implementations, the partner can specify the types of events that can be attributed to other events. For example, the partner may configure the attributable events to include app installations, purchases, and/or other events. In some implementations, receiving event data for an attributable event (e.g., as specified by a partner) may trigger the persona attribution module 514 to attribute the received event to other events (e.g., in matched personas). In these implementations, some events may not trigger the persona attribution module 514 to attribute the events, even if matching personas exist.

Although the partner may specify various matching and attribution parameters described herein, the partners may also opt out of having their data used for matching and attribution. These preferences may be stored in the partner configuration data store 202.

Figure 11:
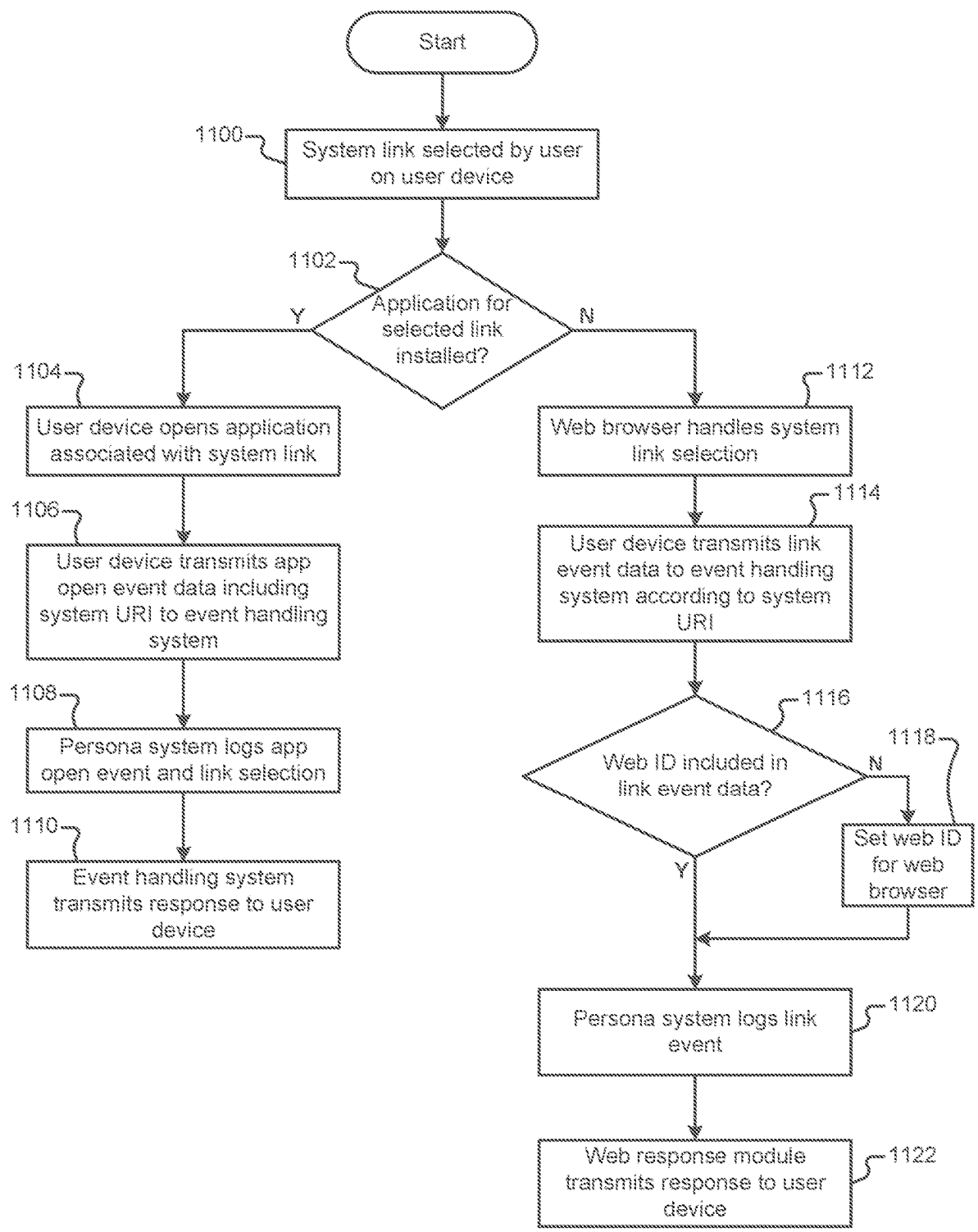
FIG. 11 illustrates a method describing how the user device and attribution system handle the selection of a system link by a user.

FIG. 11 illustrates a method describing how the user device 102 and attribution system 110 may handle the selection of a system link 126 by the user. Initially, in block 1100, the user selects a system link 126 on the user device 102. It may be assumed that the system link includes a system URI that access a state of an application (e.g., a particular page in an application). The user device may handle the selection of the system link in different ways, depending on if the application is installed. If the application is installed on the user device in block 1102 and the user device is configured to launch the application in response to selection of the system link, the user device may launch the application associated with the system link in block 1104. Upon opening, in block 1106, the app module 114 may be configured to transmit app event data to the event handling system 104 (e.g., the app response module 500). The system URI and device ID (e.g., an advertising ID) may be included in the app event data, along with additional data, such as user identification data. In block 1108, the persona system 100 may log the app open event in a persona associated with the device ID. Additionally, the persona system 100 may log the selection of the system link. The app response module 500 may then handle the app open event (e.g., look for an app open attribution) and transmit a response to the user in block 1110.

In some implementations, the web module 116 may be configured to modify the system URI of the selected system link before the application is launched. For example, the web module 116 may be configured to append a web ID to the system URI, the combination of which is passed to the application being opened. In this example, the app open event transmitted to the event handling system may include the combination of the system URI and the web ID (e.g., the web ID may be added to the system URI) along with the device ID. The persona generation module 510 may generate a persona including both a web ID and the other device ID in this example. At this time, the received event data may be included in a new persona or matched to existing personas (e.g., personas that include the received web ID and/or the other device ID).

In the case the application is not installed on the user device 102 in block 1102, the web browser 136 may handle the selection of the system link 126 in block 1112. In block 1114, the web browser 136 may transmit the web event data to the event handling system 104 (e.g., the web response module 502) according to the system URI. In some implementations, the user device 102 may transmit a web ID in the web event data, along with other data, such as a username. In the case the user device 102 does not include a web ID in block 1116, the event handling system 104 (e.g., the web response module 502) may set a web ID (e.g., cookie ID) for the web browser 116 in block 1118. The persona system 100 logs the link event in block 1120. The event handling system 104 (e.g., web response module 502) may then handle the link event according to the link data associated with the system URI in block 1122. For example, the web response module 502 may redirect the web browser to the digital distribution platform 122 to download the application, assuming the partner configured the routing data to do so.

In some implementations, the web response module 502 may transmit instructions (e.g., including JavaScript code) to the user device 102 for controlling how the user device 102 responds to the link event. The instructions may have been configured by the partner and indicated in the link data. In some cases, the instructions may attempt to open the application using the system URI. If the application is not installed, the instructions may redirect the web browser to the digital distribution platform 122 to download the application. In some cases, a web ID may be appended to the system URI by the web module 116 (e.g., using JavaScript) before the instructions attempt to open the application. If the application is opened successfully and app event data is transmitted to the event handling system 104 including the web ID and another device ID, then the persona generation module 510 may generate a persona including both a web ID and the other device ID, as described above. Although the user device 102 may be configured to use the web browser 136 to handle link selection in cases where an application is not installed, in some cases, the user device 102 may handle link selection using the web browser according to FIG. 11 even when the application for the system link is installed.

Figure 12:
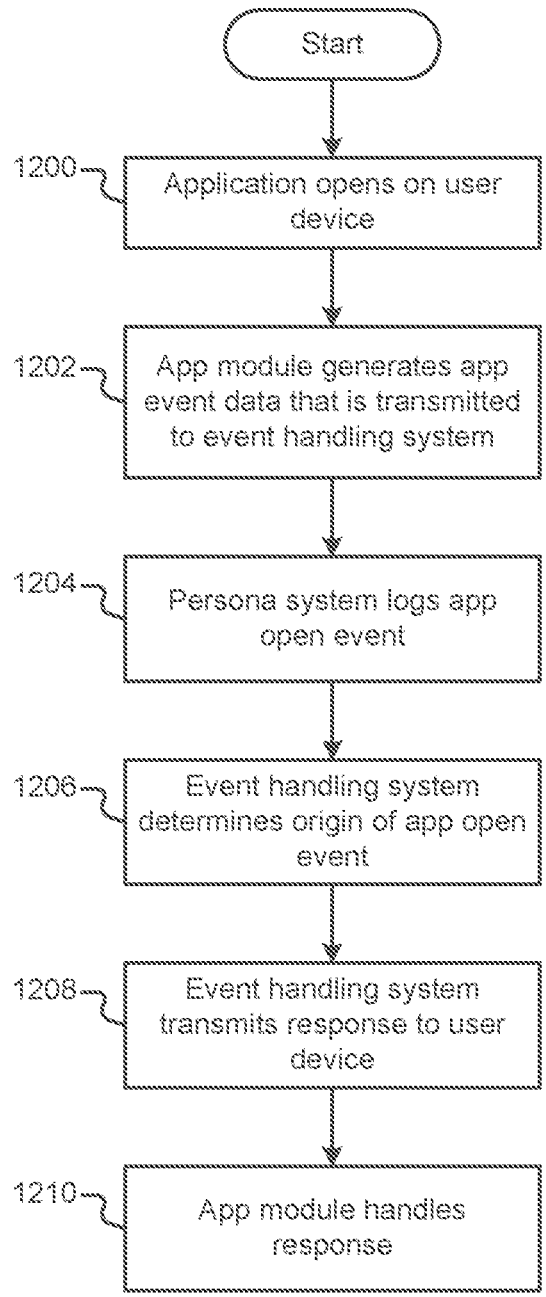
FIG. 12 illustrates an example method describing operation of a user device and the attribution system when an application is opened on the user device.

FIG. 12 illustrates an example method describing operation of the user device 102 and the attribution system 110. In block 1200, an application is opened on the user device 102. In block 1202, the user device 102 transmits app event data 300-1 to the event handling system 104 according to the app module 114 included in the application. The app event data 300-1 may indicate that the event is an app open event. In block 1204, the persona system 100 logs the app open event as described herein.

The event handling system 104 determines the origin of the app open event in block 1206. For example, the event handling system 104 may determine that the app open event resulted from the selection of a link (e.g., a system link) if the app event data 300-1 includes a link (e.g., a system URI). As another example, the event handling system 104 may determine that the app open event is an installation event. In some implementations, the app module 114 may be configured to store data on the user device 102 that indicates whether the application has been opened before. In some implementations, upon opening the application for the first time, the app module 114 may store data (e.g., set a bit) on the user device 102 indicating that the app open event is a first app open event. The app event data transmitted to the event handling system 104 may include an indication that the app open event is the first app open event.

In other implementations, the app response module 500 may determine whether the app open event is a first app open event based on whether the app open event includes data that has been previously sent from the app response module 500. For example, the app response module 500 may be configured to transmit data to the user device 102 in response to app open events. In this example, the app module 114 may be configured to transmit the data back during subsequent app open events. If such data is not included in a received app open event, the app response module 500 may determine that the app open event is a first app open event since installation of the application.

The app response module 500 may determine whether the installation is a reinstallation based on stored personas. For example, the app response module 500 may determine that the app open event indicates a reinstallation of the application if an installation event already exists for the device ID in another persona. In other implementations, the user device 102 may determine that the install is a reinstall event and transmit data to the event handling system 104 indicating that the install is a reinstall event.

In block 1208, the event handling system 104 transmits a response 302-1 to the user device 102 based on the origin of the app event. In block 1210, the app module 114 handles the response 302-1.

Figure 13:
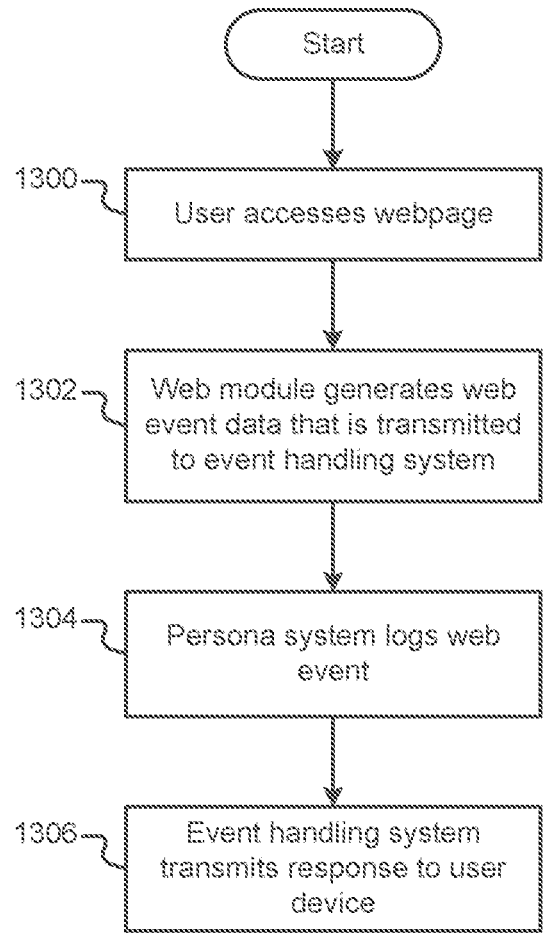
FIG. 13 illustrates an example method describing operation of a user device and the attribution system in the scenario where a user accesses a partner's webpage.

FIG. 13 illustrates an example method describing operation of the user device 102 and the attribution system 110 in the case a user accesses a partner's webpage. In block 1300, the user accesses a webpage. In block 1302, the user device 102 transmits web event data 300-3 to the event handling system 104 (e.g., web response module 502) according to the web module 116 included in the partner website 116. The web event data 300-3 may indicate that the event is a webpage view event, and may include other data, such as user identification data and source data. The persona system 100 logs the webpage view event in block 1304. If the web event data 300-3 includes a web ID, the persona generation module 510 may generate/update a persona associated with the web ID. The web response module 502 may optionally provide a response to the user device 102 in block 1306.

Figure 14:
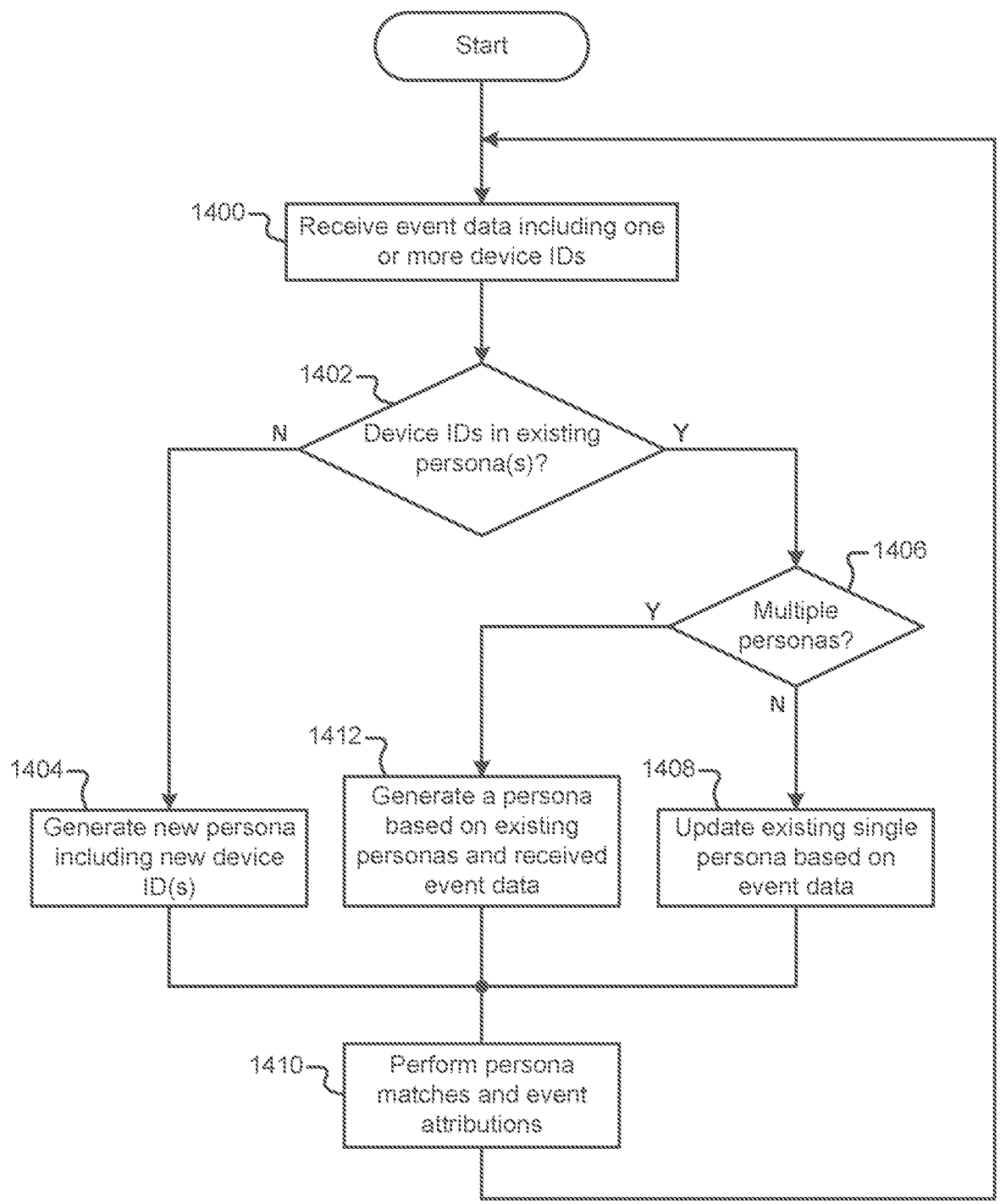
FIG. 14 illustrates an example method describing operation of the persona system in the scenario where event data includes multiple device IDs.

FIG. 14 illustrates an example method describing operation of the persona system 100 in the scenario where the event data 300 (e.g., app event data 300-1) includes multiple device IDs (e.g., a web ID and another device ID). Such a scenario may occur in cases where a web ID is included in transmitted app event data 300-1.

Initially, in block 1400, the event handling system 104 receives event data 300 including one or more device IDs. If the device IDs are not included in an existing persona in block 1402, then the persona generation module 510 may generate a new persona associated with the device IDs in block 1404. If both device IDs are included in an existing persona in block 1406, then the persona generation module 510 may update the existing persona with the received event data 300 in block 1408. The persona matching module 512 and persona attribution module 514 may then perform matching operations and make attributions in block 1410, as described above.

In some cases, each of the device IDs may be included in separate existing personas in block 1406. For example, one existing persona may be associated with the received web ID and another existing persona may be associated with the other received device ID. In this case, the persona generation module 510 may determine that the two existing personas belong to the same user device and should therefore be included in a single persona. Matching two previously existing personas in this manner may be considered highly reliable. Accordingly, the persona generation module 510 may combine the two previously existing personas into a new persona in block 1412. The new persona generated in block 1412 can also include the newly received event data, and in some cases, additional persona references. In some cases, prior to combining the previously existing personas, the personas may have been previously linked to one another by persona references (e.g., based on matching by device/browser metadata). The persona attribution module 514 may attempt to attribute the new event to prior events. In some cases, the previously existing personas may each include multiple events. In these cases, the persona attribution module 514 may determine that some events from the previously existing personas may be attributable to other events included in the previously existing personas.

Figure 15:
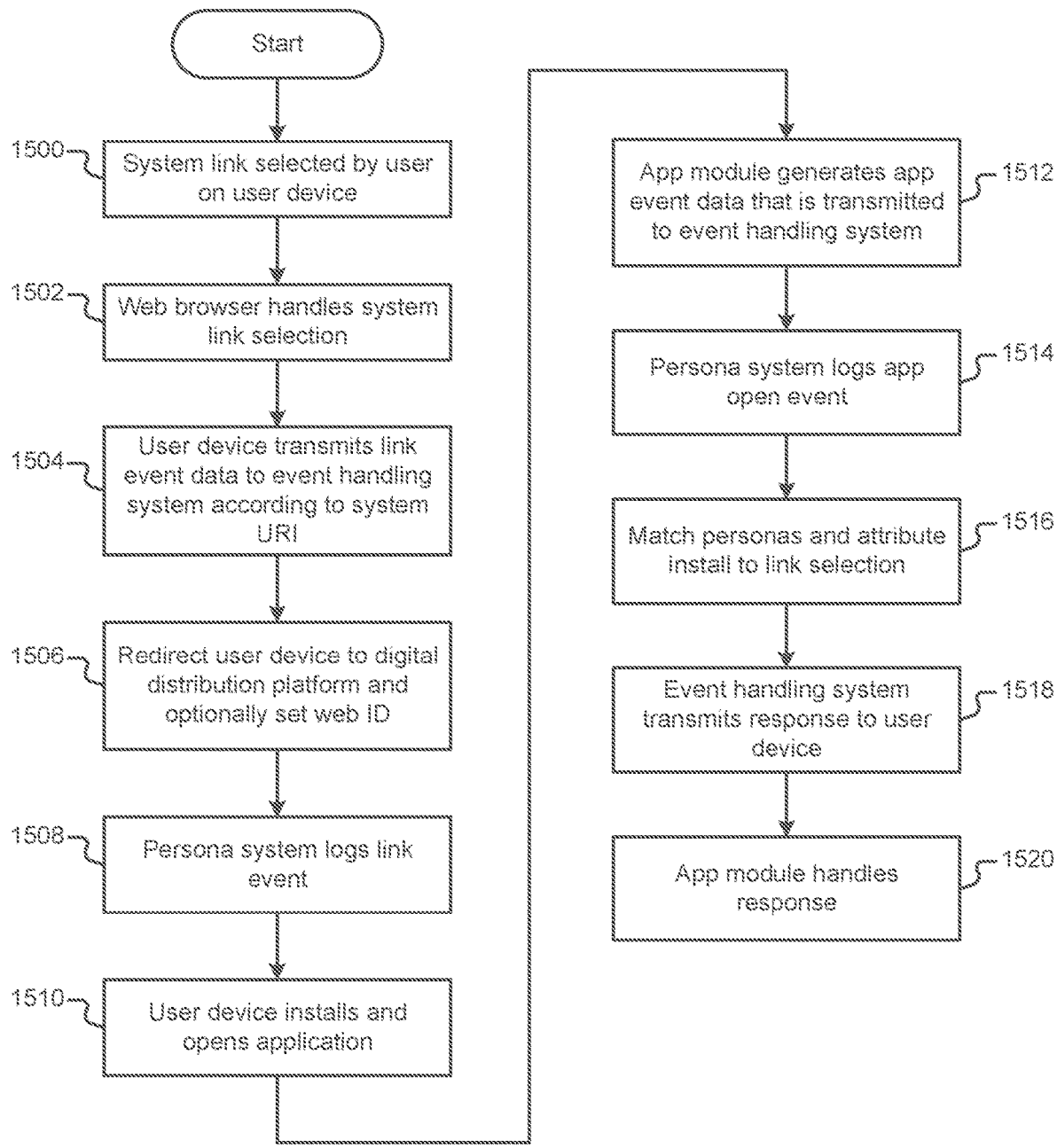
FIG. 15 illustrates an example method describing operation of the attribution system in the scenario where an application installation event is attributed to a link selection event.

FIG. 15 illustrates an example method describing operation of the attribution system 110 in the scenario where an application installation event is attributed to a link selection event. In the method of FIG. 15, it may be assumed that the system link is for a partner's application that is not installed on the user device. In blocks 1500-1504, the user selects a system link 126 on the user device 102 and the web browser 136 handles the link selection and transmits link event data 300-2 to the event handling system 104. In block 1506, the event handling system 104 (e.g., web response module 502) redirects the user device 102 (e.g., web browser 136) to the digital distribution platform 122 and optionally sets a web ID, if a web ID was not received in the event data. Specifically, the event handling system 104 may redirect the user device 102 to the page for downloading the application associated with the system link (e.g., as specified by the partner in the link data). The persona system 100 logs the event in block 1508 (e.g., by the web ID).

In block 1510, the user device 102 installs the newly downloaded application and opens the application for the first time. In block 1512, the user device 102 transmits app event data 300-1 including a device ID to the event handling system 104. In blocks 1514-1516, the persona system 100 logs the app event data, matches the persona including the device ID to the persona including the web ID (e.g., based on device/browser metadata), and attributes the installation of the application to the selection of the system link 126. In blocks 1518-1520, the event handling system 104 may then optionally transmit a response to the user device 102 that is handled by the app module 114. For example, the event handling system 104 (e.g., app response module 500) may redirect the newly installed application to the resource (e.g., application state) identified in the selected system link 126.

Although the method of FIG. 15 describes attribution of an app installation event to selection of a system link, app installation events, and other types of events, may be attributed other types of link selection events. For example, events may be attributed to link clicks or other custom events that are reported to the event handling system 104 by the web/app module 114, 116. Also note that the selected system link in FIG. 15 may have been generated in a variety of different ways, such as via a sharing event with another user or by a partner device interacting with the partner interface system 108. In the case that the selected system link was generated by another user via a sharing event, the app installation event may be attributed to an event in the user's persona that shared the link.

Figure 16:
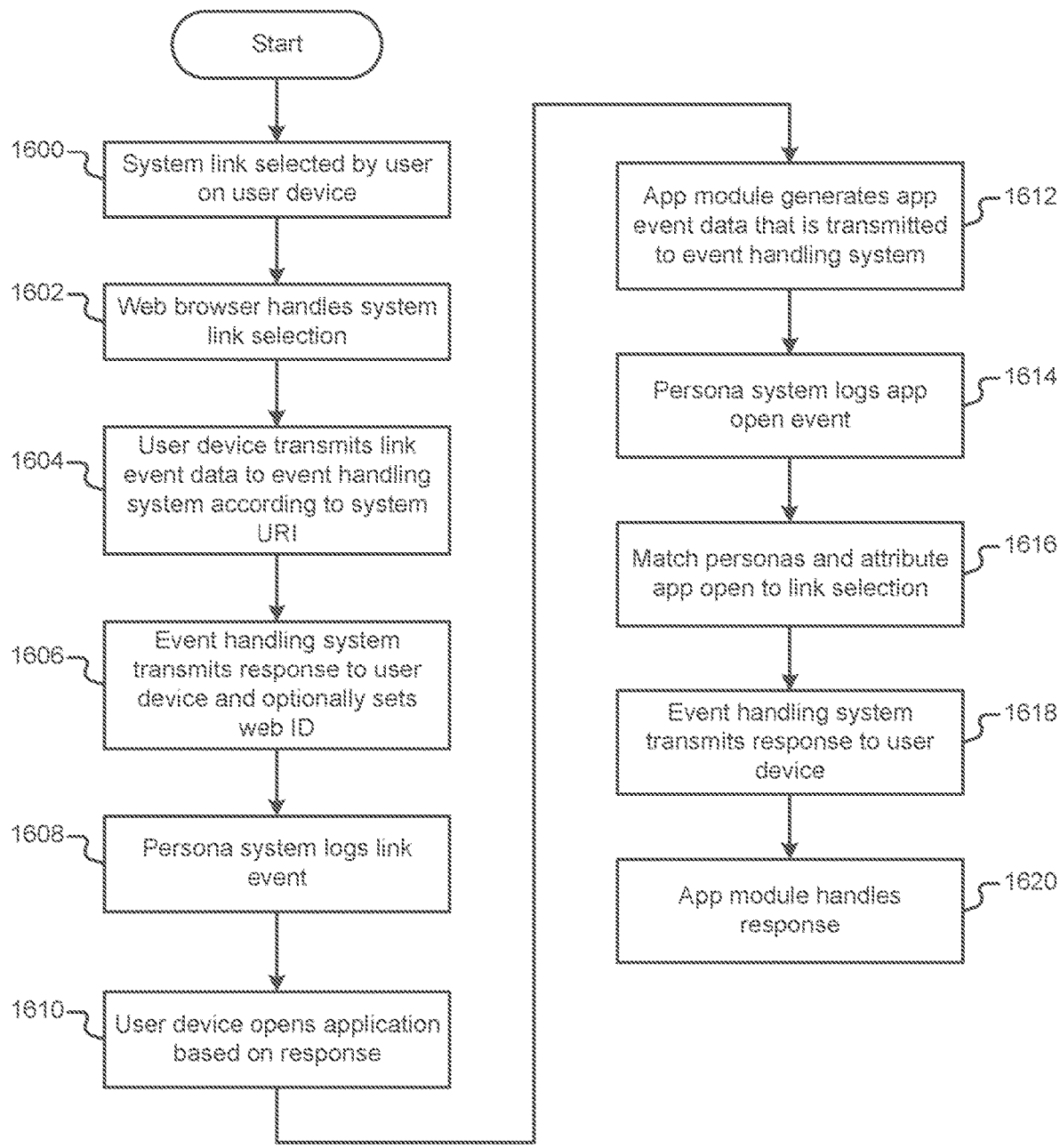
FIG. 16 illustrates an example method describing operation of the attribution system in the scenario where an application open event is attributed to a link selection event.

FIG. 16 illustrates an example method describing operation of the attribution system 110 in the scenario where an app open event is attributed to a link selection event. In the method of FIG. 16, it may be assumed that the system link 126 is for a partner's application that is installed on the user device 102. It may also be assumed that the user device 102 is configured to redirect system links to the event handling system 104 using the web browser. Initially, in blocks 1600-1604, the user selects a system link 126 on the user device 102 and the web browser 136 handles the link selection and transmits link event data 300-2 to the event handling system 104. In block 1606, the event handling system 104 (e.g., web response module 502) redirects the user device 102 (e.g., web browser 136) to open the application and optionally sets a web ID, if a web ID was not received in the event data. The persona system 100 logs the event in block 1608 (e.g., indexed by the web ID).

In blocks 1608-1610, the user device 102 opens the application and generates app event data 300-1 (including a device ID) that is transmitted to the event handling system 104. In blocks 1614-1616, the persona system 100 logs the app event data, matches the persona including the device ID to the persona including the web ID (e.g., based on device/browser metadata), and attributes the opening of the application to the selection of the system link. In blocks 1618-1620, the event handling system 104 may then optionally transmit a response to the user device 102 that is handled by the app module 114. For example, the event handling system 104 (e.g., app response module 500) may redirect the newly installed application to the resource (e.g., application state) identified in the selected system link 126.

Figure 17:
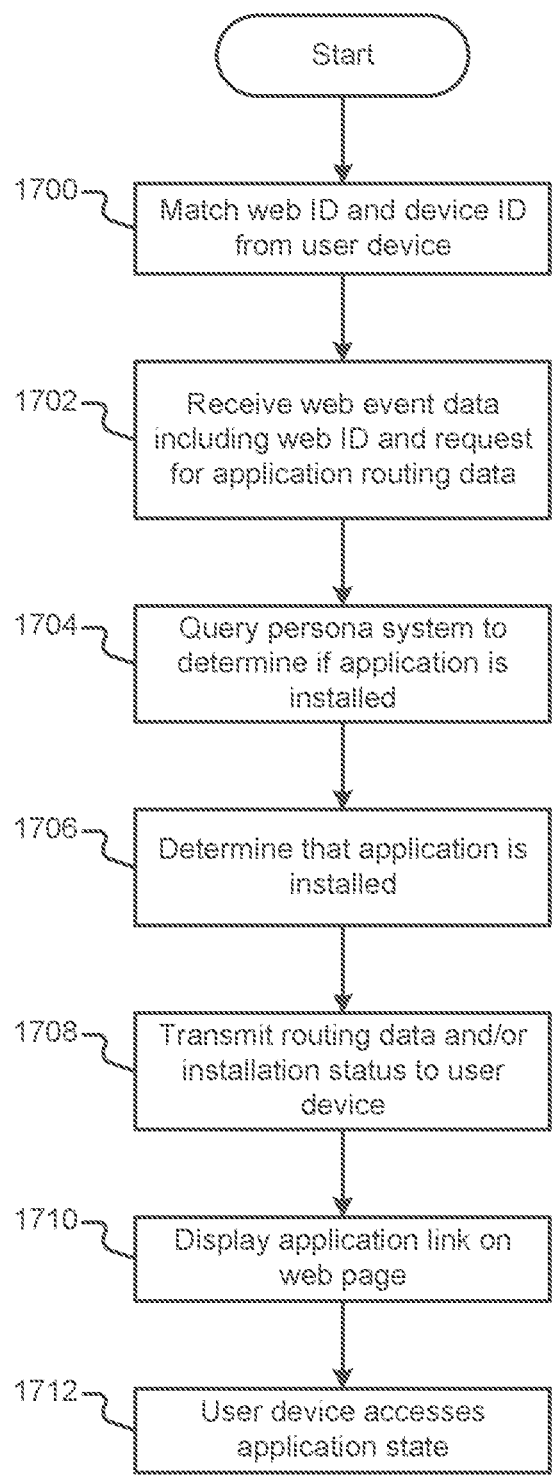
FIG. 17 illustrates an example method for modifying behavior of an accessed webpage based on the installation status of an application associated with the webpage.

FIG. 17 illustrates an example method for modifying behavior of an accessed webpage based on the installation status of an application associated with the webpage. In the method of FIG. 17, the web module 116 may be configured to modify the webpage based on the installation status of an application. For example, the web module 116 may be configured to include a user-selectable application link that accesses a state of an application if the application is installed on the user device 102. For example, if the application is installed, the web module 116 may provide a link to an application state that is similar to the webpage being viewed. In a specific example, a partner may operate websites and corresponding applications that include similar content that can be accessed by the partner's website and/or partner's application. Example similar content may include, but is not limited to, pages including products for sale, services for sale, hotel/room accommodations, music for playing, images/videos, blog posts, and news articles.

Example types of application links may include hyperlinks within the webpage and/or banner links that overlay the webpage. The application link may be generated by the web module 116 and/or the web response module 502, depending on how the partner configures the web module 116 and/or the web response module 502. In some implementations, the web response module 502 may generate the application link based on data included in the web event (e.g., based on the web URL) or content on the webpage based on configurations specified by the partner. For example, the partner may specify that portions of the web URL and/or the webpage content be used to generate the application link. In these implementations, the web response module 502 may respond to the web event with routing data that can route the user to the application state when the application link is selected. For example, the user device 102 (e.g., the OS 134) may recognize the format of the routing data (e.g., the domain and/or path) as capable of being handled by an application installed on the user device 102. In this case, the user device 102 (e.g., the OS 134) may launch the application and pass the routing data (e.g., URL) to the launched application. Example routing data may include a domain name (e.g., example.com or www.example.com) and a path (e.g., example.com/path_segment1/path_segment2/). The partner may specify the format of the routing data along with instructions for completing any routing data based on the web URL and/or other data, such as webpage content.

In some implementations, the web response module 502 may be configured to respond to the web event with an indication of whether the application is installed. In these implementations, if the web response module 502 responds that the application is installed, the web module 116 may generate the application link (e.g., based on the web URL and/or page data).

The application referred to with respect to FIG. 17 may be referred to as an "Example App." Initially, in block 1700, the persona matching module 512 matches a web ID and device ID (e.g., as a probabilistic match or strong match) from a user device such that future web events and app events received from the user device can be associated with the user device. The device ID is associated with event data generated by the Example App. In some cases, the device ID may have been associated with the installation of the Example App (i.e., an installation event). In other cases, the device ID may have been associated with another type of app event originating from the Example App. In any case, receipt of the app event including the device ID indicates that the Example App is installed on the user device.

In block 1702, the web response module 502 receives web event data including the web ID. In some implementations, the web event data may also include a request for routing data for the Example App. In other implementations, the web response module 502 may be configured to provide the routing data for the Example App without an explicit request. In block 1704, the web response module 502 queries the persona system 100 to determine whether the Example App is installed. In block 1706, the persona system 100 responds by indicating that the Example App is installed. In block 1708, the web response module 502 responds to the web event by transmitting routing data for the application link and/or transmitting an installation status of the Example App.

In block 1710, the web browser 136 (e.g., the web module 116) displays the application link on the webpage. In block 1712, the user selects (e.g., touches/clicks) the application link and the installed Example App accesses the application state (e.g., application page) associated with the application link.

Figure 18:
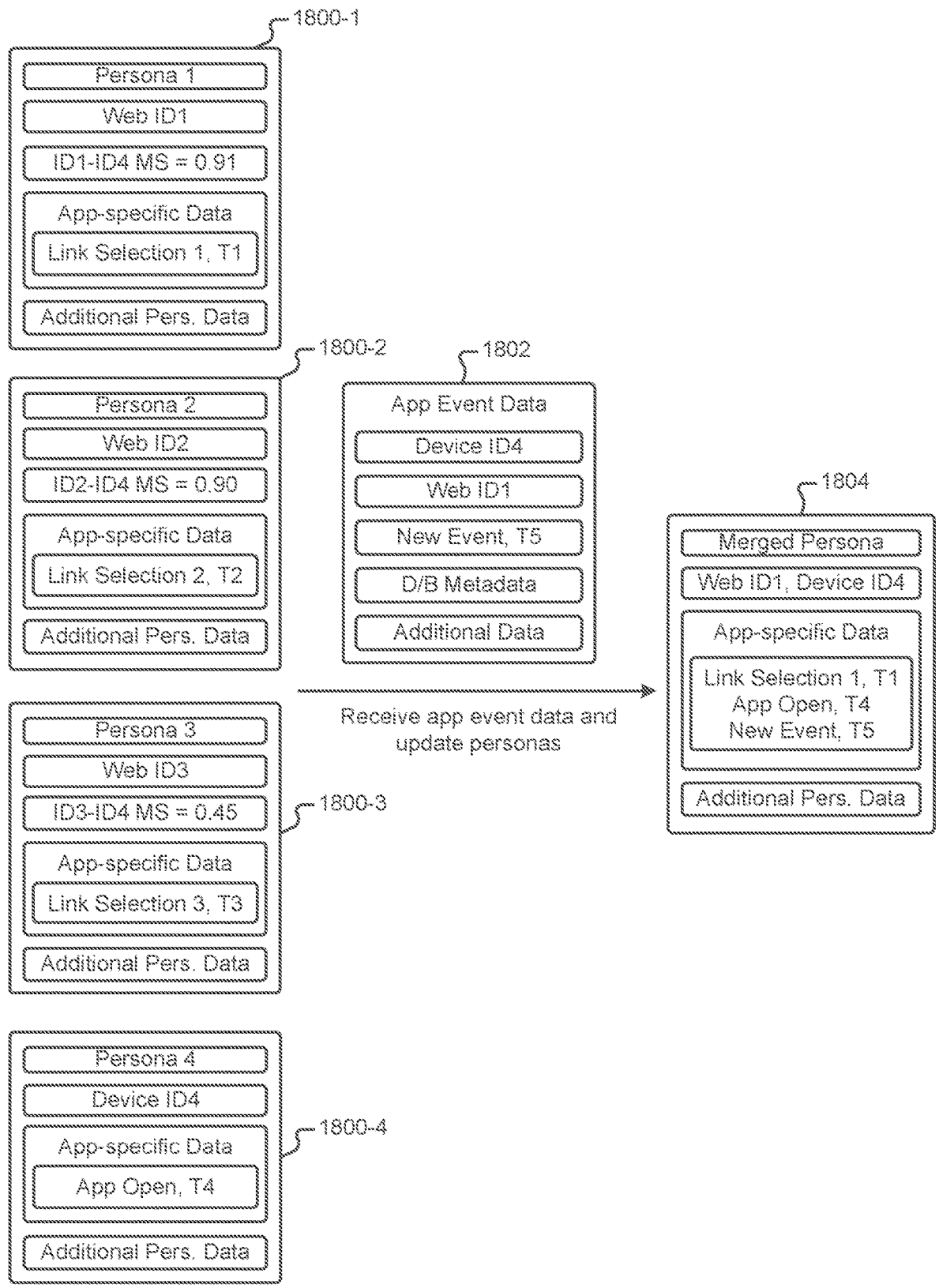
FIG. 18 illustrates multiple personas that are matched to one another.

FIG. 18 illustrates an example scenario where multiple personas 1800-1, 1800-2, 1800-3, 1800-4 are matched to one another using probabilistic matching. Subsequently, the persona system 100 receives app event data 1802 including both a device ID and a web ID. The persona system 100 makes a strong match in response to receipt of the app event data 1802 and merges the data from persona 4 1800-4 into persona 1 1800-1 along with the new event.

FIG. 18 illustrates four initial personas 1800. Personas 1-3 1800-1, 1800-2, 1800-3 were generated in response to web events that included web IDs 1-3. Specifically, personas 1-3 were generated in response to link selections 1-3, respectively. Persona 4 1800-4 was generated in response to an application open event.

The personas 1800 illustrate a scenario where an application open event (e.g., a first application open) in persona 4 1800-4 may be attributed to one or more previous link selections in personas 1-3 1800-1, 1800-2, 1800-3. Personas 1-3 include matching scores 0.91, 0.90, and 0.45, respectively. In FIG. 18, it can be assumed that the persona system 100 uses a threshold matching score of 0.85 to determine attribution. In this case, the persona attribution module 514 may determine that the application open in persona 4 can be attributed to the link selections in personas 1-2. The matching score of 0.45 associated with persona 3 may not be considered for attribution since it is less than the threshold matching score. In some implementations, the persona attribution module 514 may refrain from assigning a matching score to a persona if the matching score is less than the threshold matching score.

The multiple possible attributions associated with personas 1-4 1800 illustrates how there may be some ambiguity present from an attribution standpoint. For example, an app open event should generally be attributed to a single link selection, instead of two link selections. In these cases, the persona attribution module 514 can select single a persona for attribution from the multiple possible personas. For example, the persona attribution module 514 may make an attribution based on the matching score, such as selecting the personas associated with the highest matching score. As another example, the persona attribution module 514 may make an attribution associated with the time the persona is received, such as selecting the most recent persona for matching.

In FIG. 18, the persona system 100 receives app event data 1802 that includes web ID 1 and device ID 4. The app event data 1802 includes an event identifier for a "New Event" (e.g., any of the events described herein) at time T5. The app event data 1802 provides a strong match between device ID4 and web ID1. In response to the app event data 1802, the persona system 100 (e.g., the persona generation module 510) merges the data of persona 4 1800-4 and persona 1 1800-1. For example, the merged persona 1804 includes web ID1, device ID4, the events from persona 1 and persona 4, and the new event. After generating the merged persona 1804, the persona attribution module 514 may update the attribution data associated with the app open event at T4. For example, the persona attribution module 514 may delete the ambiguous matching scores. In some cases, after generating the merged persona 1804, the persona system 100 (e.g., persona generation module 510) may delete the older persona 1 and persona 4 data.

Figure 19:
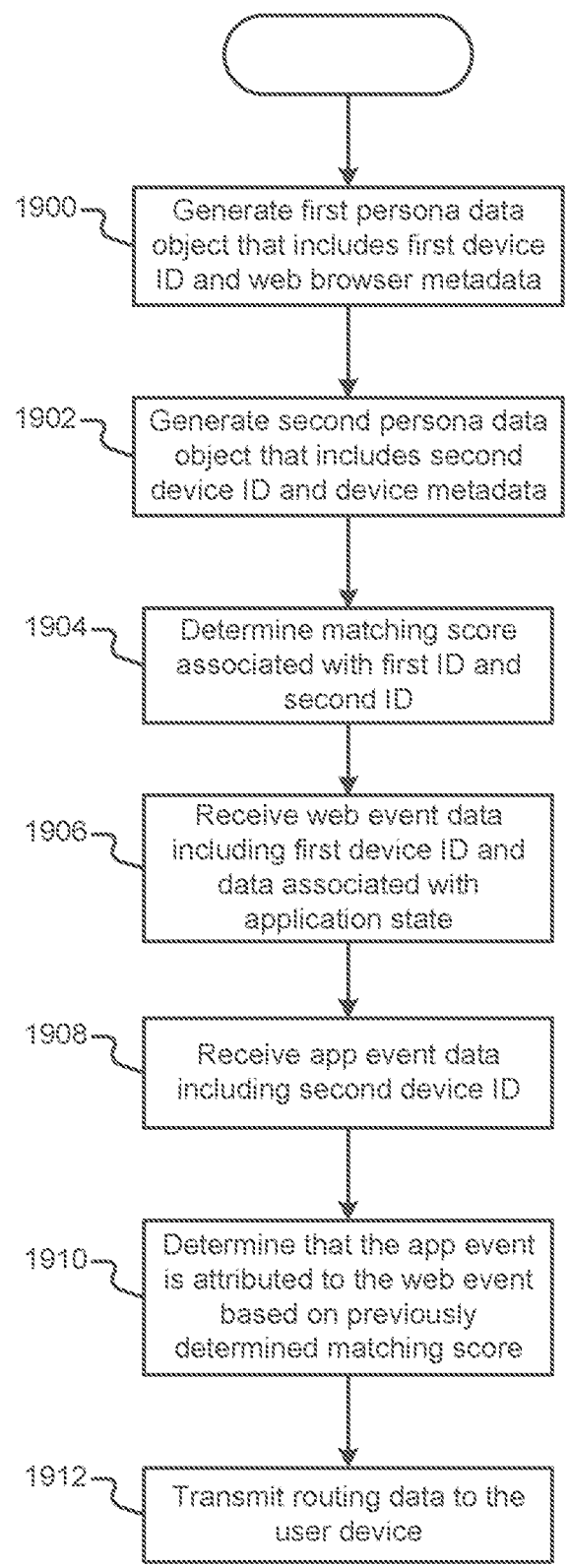
FIG. 19 illustrates an example method describing routing of a user device based on a determined matching score.

As described herein, the attribution system 110 can generate and store matching scores (e.g., probabilistic scores) to use for determining how to handle future received event data. FIG. 19 illustrates an example method describing routing of a user device based on a previously determined matching score. In block 1900, the persona system 100 generates a first persona in response to received first web event data that was generated from a first web event. The first persona may include a first device ID and web browser metadata. In block 1902, the persona system 100 generates a second persona in response to received first app event data that was generated from a first app event. The second persona may include a second device ID and device metadata. In block 1904, the persona matching module 512 determines a matching score (e.g., greater than the threshold matching score) associated with the first persona and the second persona.

In block 1906, the event handling system 104 receives second web event data generated from a second web event. The second web event data includes the first device ID and data associated with an application state. In block 1908, the event handling system 104 receives second app event data generated from a second app event. The second app event data includes the second device ID. The persona system 100 may generate personas for the second web event data and the second app event data (e.g., personas for each set of event data).

In the method of FIG. 19, it can be assumed that the event handling system 104 is configured to handle the second app event by routing the user device to an application state in the case that the app event is attributed to a prior web event that includes application state data. In block 1910, in response to receiving the second app event data and based on the previously determined matching score, the persona attribution module 514 may attribute the second app event to the second web event. In block 1912, the event handling system 104 may then transmit routing data to the user device for opening the application state associated with the application state data included in the second web event data. As described herein, in some implementations, the persona system 100 may update the previously determined matching score based on the metadata associated with the second web event data and the second app event data.

Although device IDs may uniquely identify a user device, in some cases, the same user device may be used by more than one person. In this case, the persona system 100 may differentiate between users of the same user device based on the user identification data (e.g., a username and app ID). For example, the persona generation module 510 may generate different personas for the same device IDs if the device IDs are associated with different username-app ID combinations. The persona matching module 512 may match personas that include the same device IDs and username-app ID combinations, and refrain from matching personas having the same device IDs and different username-app ID combinations. In some implementations, user identification data (e.g., usernames) can be used along with device IDs, or instead of device IDs, to identify a persona.

Although an event can be attributed to a single prior event, in some implementations of the attribution system 110, the persona attribution module 514 may be configured to attribute a single event to multiple prior events. For example, if the persona matching module 512 matches a single persona to multiple additional personas, the persona attribution module 514 may attribute an event in the single persona to events in the multiple additional personas. In this example, the prior events may come from multiple different sources, as indicated by source data associated with the prior events. The multi-source attribution data may be reported to the partner.

The system link data objects 602 and the persona data objects 600 described herein represent data stored in the link data store 504 and the persona data store 508, respectively. The data stores 504, 508 may include a variety of different data structures that are used to implement the system link data objects 602 and the persona data objects 600. For example, the system link data objects 602 and the persona data objects 600 may be implemented using one or more different data structures.

Modules and data stores included in the systems (e.g., the persona system 100, event handling system 104, link system 106, and partner interface system 108) represent features that may be included in the systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

Although the technology associated with the attribution system 110, app module 114, and web module 116 are described herein as being provided to partners (e.g., software developers), the technology may be implemented in other manners. For example, one or more parties may implement the technologies described herein according to different arrangements.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores (e.g., system link data objects 602 and persona data objects 600). Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network 120 of FIG. 1. The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A method comprising:
    generating, at a computing device, a first data object that includes a first device identifier (ID) and web browser metadata that are associated with selection of a website link in a web browser application on a user device;
    generating, at the computing device, a second data object that includes a second device ID and device metadata that are associated with an installed application on the user device, wherein the second data object is associated with an application open event generated by the installed application in response to opening of the installed application;
    determining, at the computing device, a matching score based on the web browser metadata and the device metadata, wherein the matching score indicates that the first device ID and the second device ID are likely associated with the user device;
    storing the matching score at the computing device;
    receiving, at the computing device, web event data from the user device, the web event data generated in response to a user browser action on the web browser application, wherein the web event data includes the first device ID;
    receiving, at the computing device, app event data generated by the installed application, wherein the app event data includes the second device ID, and wherein the app event data indicates that a partner-defined action has been performed by a user in the installed application;
    attributing the partner-defined action to the user browser action in response to receiving the app event data and determining the stored matching score indicates that the first and second device IDs are likely associated with the user device; and
    transmitting attribution data to a partner computing device, the attribution data indicating that the partner-defined action is attributed to the user browser action.

2. The method of claim 1, wherein the partner-defined action includes an application commerce event.

3. The method of claim 2, wherein the application commerce event is associated with the user adding an item to a shopping cart in the installed application.

4. The method of claim 2, wherein the application commerce event is associated with the user purchasing an item in the installed application.

5. The method of claim 1, wherein the partner-defined action is an access of a partner-defined application page in the installed application.

6. The method of claim 1, wherein the partner-defined action is an access of a partner-defined piece of content in the installed application.

7. The method of claim 6, wherein the piece of content includes at least one of audio content and video content.

8. The method of claim 6, wherein the partner-defined action includes sharing the piece of content in the installed application with another user device.

9. The method of claim 1, wherein the user browser action is a viewing of a partner-specified webpage.

10. The method of claim 1, wherein the user browser action is a selection of an advertisement link.

11. The method of claim 10, wherein the advertisement link is an email advertisement link.

12. The method of claim 1, further comprising:
    comparing the stored matching score to a threshold matching score; and
    determining that the matching score indicates the first device ID and the second device ID are likely associated with the user device when the matching score is greater than the threshold matching score.

13. A system comprising:
    one or more storage devices configured to store:
        a first data object that includes a first device identifier (ID) and web browser metadata that are associated with selection of a website link in a web browser application on a user device; and
        a second data object that includes a second device ID and device metadata that are associated with an installed application on the user device, wherein the second data object is associated with an application open event generated by the installed application in response to opening of the installed application; and
    one or more processing units that execute computer-readable instructions that cause the one or more processing units to:
        determine a matching score based on the web browser metadata and the device metadata, wherein the matching score indicates that the first device ID and the second device ID are likely associated with the user device;
        store the matching score in the one or more storage devices;
        receive web event data from the user device, the web event data generated in response to a user browser action on the web browser application, wherein the web event data includes the first device ID;
        receive app event data generated by the installed application, wherein the app event data includes the second device ID, and wherein the app event data indicates that a partner-defined action has been performed by a user in the installed application;
        attribute the partner-defined action to the user browser action in response to receiving the app event data and determining the stored matching score indicates that the first and second device IDs are likely associated with the user device; and transmit attribution data to a partner computing device, the attribution data indicating that the partner-defined action is attributed to the user browser action.

14. The system of claim 13, wherein the partner-defined action includes an application commerce event.

15. The system of claim 14, wherein the application commerce event is associated with the user adding an item to a shopping cart in the installed application.

16. The system of claim 14, wherein the application commerce event is associated with the user purchasing an item in the installed application.

17. The system of claim 13, wherein the partner-defined action is an access of a partner-defined application page in the installed application.

18. The system of claim 13, wherein the partner-defined action is an access of a partner-defined piece of content in the installed application.

19. The system of claim 18, wherein the piece of content includes at least one of audio content and video content.

20. The system of claim 18, wherein the partner-defined action includes sharing the piece of content in the installed application with another user device.

21. The system of claim 13, wherein the user browser action is a viewing of a partner-specified webpage.

22. The system of claim 13, wherein the user browser action is a selection of an advertisement link.

23. The system of claim 22, wherein the advertisement link is an email advertisement link.

24. The system of claim 13, wherein the one or more processing units are configured to:

compare the stored matching score to a threshold matching score; and determine that the matching score indicates the first device ID and the second device ID are likely associated with the user device when the matching score is greater than the threshold matching score.

* * * * *